(12) United States Patent
Lee et al.

(10) Patent No.: US 12,481,402 B2
(45) Date of Patent: Nov. 25, 2025

(54) DISPLAY APPARATUS

(71) Applicant: LG Display Co., Ltd., Seoul (KR)

(72) Inventors: DongHoon Lee, Daegu (KR); TaeHoon Kim, Paju-si (KR); Jinwook Choi, Seoul (KR); Dongjoong Cha, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/381,509

(22) Filed: Oct. 18, 2023

(65) Prior Publication Data

US 2024/0134482 A1 Apr. 25, 2024
US 2024/0231540 A9 Jul. 11, 2024

(30) Foreign Application Priority Data

Oct. 19, 2022 (KR) ........................ 10-2022-0135211

(51) Int. Cl.
| | | |
|---|---|---|
| *G06F 3/041* | (2006.01) | |
| *G06F 3/0354* | (2013.01) | |
| *G06F 3/044* | (2006.01) | |
| *G09G 3/3233* | (2016.01) | |
| *H10K 59/131* | (2023.01) | |
| *H10K 59/40* | (2023.01) | |

(52) U.S. Cl.
CPC ...... *G06F 3/04184* (2019.05); *G06F 3/03545* (2013.01); *G06F 3/0412* (2013.01); *G06F 3/041662* (2019.05); *G09G 3/3233* (2013.01); *G09G 2300/0842* (2013.01); *G09G 2320/02* (2013.01); *G09G 2354/00* (2013.01)

(58) Field of Classification Search
CPC .......... G06F 3/04184; G06F 3/041662; G06F 3/03545; G06F 3/0412; G09G 3/3233
See application file for complete search history.

(56) References Cited

U.S. PATENT DOCUMENTS

| | | | | |
|---|---|---|---|---|
| 2015/0123940 | A1* | 5/2015 | Park | G06F 3/0441 |
| | | | | 345/174 |
| 2018/0329526 | A1* | 11/2018 | Peretz | G06F 3/03545 |
| 2018/0348931 | A1* | 12/2018 | Kim | G09G 3/3225 |
| 2020/0144309 | A1* | 5/2020 | Jeon | H10D 86/451 |
| 2021/0383758 | A1* | 12/2021 | Yin | G09G 3/3233 |
| 2022/0140038 | A1* | 5/2022 | Bae | H10D 86/423 |
| | | | | 257/40 |
| 2022/0206626 | A1* | 6/2022 | Jang | G06F 3/041662 |

FOREIGN PATENT DOCUMENTS

KR 10-1953249 B1 6/2019

* cited by examiner

*Primary Examiner* — Sardis F Azongha
(74) *Attorney, Agent, or Firm* — Birch, Stewart, Kolasch & Birch, LLP

(57) ABSTRACT

A display apparatus can include a panel which includes a plurality of sub pixels and a plurality of touch electrodes, a first driving circuit which supplies a driving signal to the panel in a driving period and holds the driving signal in the stand-by period, and a second driving circuit which supplies a mutual sensing signal to the panel and supplies a self-sensing signal to the panel in the stand-by period.

20 Claims, 13 Drawing Sheets

DISPLAY APPARATUS

CROSS-REFERENCE TO RELATED APPLICATIONS

This application claims priority to Korean Patent Application No. 10-2022-0135211 filed on Oct. 19, 2022, in the Korean Intellectual Property Office, the entire disclosure of which is hereby expressly incorporated by reference into the present application.

BACKGROUND

Field

The present disclosure relates to a display apparatus with improved touch sensing performance.

Discussion of the Related Art

As the information society progresses, various demands for display devices which display images are increasing and various types of display devices such as a liquid crystal display device or an organic light emitting display device are utilized. An organic light emitting display apparatus which includes an organic light emitting diode (OLED) is used in various ways with the advantages of a fast response speed, large luminous efficiency, luminance, and viewing angle.

The organic light emitting display apparatus can include various functions. For example, the organic light emitting display apparatus can include a touch function which senses a user's touch input. However, in some cases, a noise can be caused in the display apparatus due to the touch input. When the noise is generated, the quality of the display apparatus can be degraded. As such, there is a need to address the noise issue, which can improve the touch sensing operation of the display apparatus.

SUMMARY OF THE DISCLOSURE

An object to be achieved by the exemplary embodiments of the present disclosure is to provide a display apparatus and an operating method thereof, which control a sensing period of a touch input to improve a display quality by reducing a noise due to the touch input.

Objects of the present disclosure are not limited to the above-mentioned objects, and other objects, which are not mentioned above, can be clearly understood by those skilled in the art from the following descriptions.

According to an aspect of the present disclosure, a display apparatus includes a panel which includes a plurality of sub pixels and a plurality of touch electrodes, a first driving circuit which supplies a driving signal to the panel in a driving period and holds the driving signal in the stand-by period, and a second driving circuit which supplies a mutual sensing signal to the panel in the driving period and supplies a self-sensing signal to the panel in the stand-by period.

Other detailed matters of the exemplary embodiments are included in the detailed description and the drawings.

According to an aspect of the present disclosure, the display apparatus can reduce the noise due to the touch input by controlling a sensing period of the touch input to improve the display quality.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENTS

Figure 1:
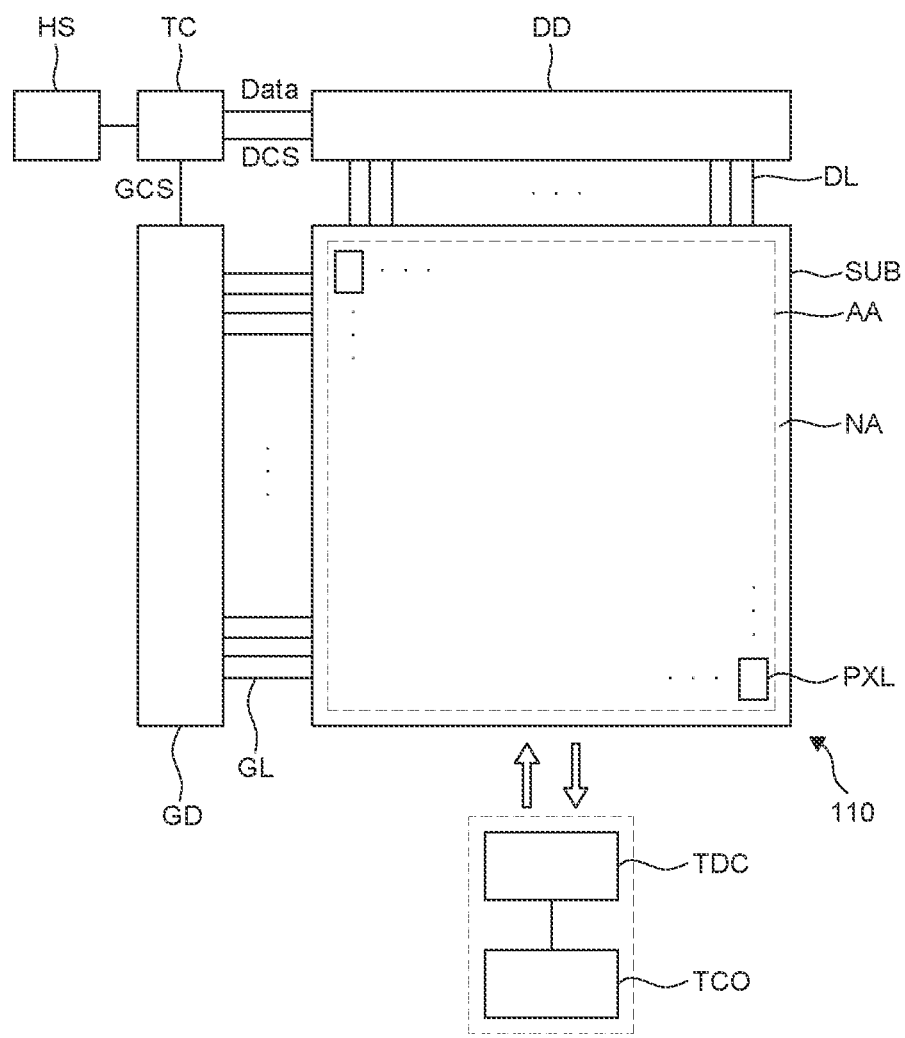
FIG. 1 is a block diagram of a display apparatus according to an exemplary embodiment of the present disclosure.

The terms used in the embodiments of this specification have been selected from general terms that are currently widely used as much as possible while considering the functions in the present disclosure, but they can vary depending on the intention or precedent of a person skilled in the art, the emergence of new technologies, and the like. there is. In a specific case, there is a term arbitrarily selected by the applicant, and in this case, the meaning will be described in detail in the corresponding description. Therefore, the term used in this specification should be defined based on the meaning of the term and the overall content of the present disclosure, not simply the name of the term.

When it is said that a certain part "includes," "has," "comprises," etc., a certain component throughout the specification, it means that it can further include other components, not excluding other components unless otherwise state.

Expressions of "at least one of a, b, and c" described throughout the specification include 'a alone', 'b alone', 'c alone', 'a and b', 'a and c', 'b and c', or 'all a, b, and c'. Advantages and features of the present invention, and methods of achieving them, will become clear with reference to the embodiments described below in detail in conjunction with the accompanying drawings.

The shapes, sizes, ratios, angles, numbers, and the like illustrated in the accompanying drawings for describing the exemplary embodiments of the present disclosure are merely examples, and the present disclosure is not limited thereto. Further, in the following description of the present disclosure, a detailed explanation of known related technologies can be omitted to avoid unnecessarily obscuring the subject matter of the present disclosure.

The terms such as "including," "comprising," "having," and "consist of" used herein are generally intended to allow other components to be added unless the terms are used with the term "only". Any references to singular can include plural unless expressly stated otherwise.

In the case of a description of a positional relationship, for example, when the positional relationship of two parts is described as 'on', 'above', 'below', 'next to', etc., between the two parts One or more other parts can be located in. When an element or layer is referred to as being "on" another element or layer, it includes all cases where the element or layer is directly on top of another element or another layer or other element intervenes therebetween. Further, what is referred to as "on" includes not only a case of being placed vertically or overlapping, but also a case of being placed on a diagonal, for example, even though it is not vertical. The same is true for "under".

Although the terms "first", "second", and the like are used for describing various components, these components are not confined by these terms and may not define order or sequence. These terms are merely used for distinguishing one component from the other components. Therefore, a first component to be mentioned below can be a second component in a technical concept of the present disclosure.

The features of various embodiments of the present disclosure can be partially or entirely adhered to or combined with each other and can be interlocked and operated in technically various ways, and the embodiments can be carried out independently of or in association with each other.

In addition, the terms that will be described later are defined in consideration of the functions in the implementation of this specification, which can change depending on the intention of the user, operator, or custom. Therefore, the definition should be made based on the contents throughout the specification. Further, the term "exemplary" means and is interchangeably used with the term "example."

A transistor which configures a pixel circuit of the present disclosure includes at least one of oxide thin film transistor (oxide TFT), amorphous silicon TFT (a-Si TFT), and a low temperature poly silicon (LTPS) TFT, but other types of transistors can be used.

The following exemplary embodiments of the present disclosure will be described with respect to an organic light emitting display. However, the exemplary embodiments of the present disclosure are not limited to the organic light emitting display, but can also be applied to an inorganic light emitting display including an inorganic light emitting material. For example, the exemplary embodiments of the present disclosure can be applied to a quantum dot display apparatus.

When a numerical value or corresponding information (e.g., level, etc.) for a component is mentioned in this specification, even if there is no separate explicit description, the numerical value or the corresponding information is not indicated by various factors (e.g., process factors, internal or external shocks, noise, etc.) can be interpreted as including a range of errors that can occur.

Hereinafter, according to exemplary embodiments of the present disclosure will be described in detail with reference to accompanying drawings. All the components of each display apparatus according to all embodiments of the present disclosure are operatively coupled and configured.

FIG. 1 is a block diagram of a display apparatus according to an exemplary embodiment of the present disclosure.

The display apparatus of FIG. 1 or any other figure or example according to the exemplary embodiments of the present disclosure can be applied to the electroluminescent display. The electroluminescent display apparatus can include an organic light emitting diode (OLED) display apparatus, a quantum dot light emitting diode display apparatus, or an inorganic light emitting diode display apparatus.

Referring to FIG. 1, a display apparatus 100 can include a display panel (or a panel) 110 and one or more driving circuits, as components for displaying images.

The driving circuits are circuits for driving the display panel 110 and can include a data driving circuit DD, a gate driving circuit GD, a timing controller TC, and a touch sensing circuit. According to the exemplary embodiment, the driving circuit can be divided into a first driving circuit and a second driving circuit. The first driving circuit can include at least one of the data driving circuit DD, the gate driving circuit GD, and the timing controller TC. The second driving circuit can include a touch sensing circuit.

Even though in FIG. 1, for the convenience of description, the driving circuit is functionally classified to be illustrated as the data driving circuit DD, the gate driving circuit GD, the timing controller TC, and a touch sensing circuit, it is not limited thereto. For example, at least some configurations of the driving circuit can be integrally formed.

The display panel 110 can include an active area (or display area) AA in which images are displayed and a non-active area (or non-display area) NA in which no image is displayed. The non-active area NA can be an outer border area of the active area AA and also referred to as a bezel area. All or a part of the non-active area NA can be an area which is visible from a front surface of the display apparatus 100 or is bent so as not to be seen from the front surface of the display apparatus 100. The non-active area NA can surround the active area AA entirely or only in part, and can include one or more areas such as a bezel area, a pad area, etc.

The display panel 110 can include a substrate SUB and a plurality of sub pixels PXL disposed on the substrate SUB. Further, the display panel 110 can further include various types of signal lines to drive the plurality of sub pixels PXL.

In one exemplary embodiment, the display panel 110 can include a plurality of sub pixels and a plurality of touch electrodes. The plurality of sub pixels can include a plurality of first sub pixels each emitting a first color light, a plurality of second sub pixels each emitting a second color light, and a plurality of third sub pixels each emitting a third color light. The plurality of touch electrodes can include a plurality of reception electrodes which receives a touch signal and a plurality of transmission electrodes which transmits a touch signal.

The display apparatus 100 according to the exemplary embodiments of the present disclosure can also be a liquid crystal display apparatus or a light emitting display apparatus in which the display panel 110 emits light by itself. When the display apparatus 100 according to the exemplary embodiments of the present disclosure is a self-emitting display apparatus, each of a plurality of sub pixels PXL can include a light emitting diode.

For example, the display apparatus 100 according to the exemplary embodiments of the present disclosure can be an organic light emitting display apparatus in which the light emitting diode is implemented by an organic light emitting diode. As another example, the display apparatus 100 according to the exemplary embodiments of the present disclosure can be an inorganic light emitting display apparatus in which the light emitting diode is implemented by an inorganic material based light emitting diode. As another example, the display apparatus 100 according to the exemplary embodiments of the present disclosure can be a quantum-dot (QD) display apparatus in which the light emitting diode is implemented by a quantum dot which is a self-emitting semiconductor crystal.

Structures of the plurality of sub pixels PXL can vary depending on a type of the display apparatus 100. For example, when the display apparatus 100 is a self-emitting display apparatus in which the sub pixel PXL emits by itself, each sub pixel PXL can include a self-emitting display device, one or more transistors, and one or more capacitors.

For example, various types of signal lines can include a plurality of data lines DL which transmits data signals (also referred to as data voltages or image signals) and a plurality of gate lines GL which transmits gate signals (also referred to as scan signals).

The plurality of data lines DL and the plurality of gate lines GL can intersect each other. Each of the plurality of data lines DL can be disposed to extend in a first direction. Each of the plurality of gate lines GL can be disposed to extend in a second direction.

Here, the first direction can be a column direction and the second direction can be a row direction. Alternatively, the first direction can be a row direction and the second direction can be a column direction. The first and second directions can cross each other perpendicularly or at an angle less than 90 degrees.

The data driving circuit DD is a circuit configured to drive the plurality of data lines DL and can output data signals to the plurality of data lines DL. The gate driving circuit GD is a circuit configured to drive the plurality of gate lines GL and can output gate signals to the plurality of gate lines GL.

The timing controller TC can be a device configured to control the data driving circuit DD and the gate driving circuit GD. The timing controller TC can control a driving timing for the plurality of data lines DL and a driving timing for the plurality of gate lines GL.

The timing controller TC can supply a data driving control signal DCS to the data driving circuit DD to control the data driving circuit DD. The timing controller TC can supply a gate driving control signal GCS to the gate driving circuit GD to control the gate driving circuit GD.

The timing controller TC receives input image data from a host system HS to supply image data Data to the data driving circuit DD based on the input image data.

The data driving circuit DD can supply the data signals to the plurality of data lines DL in response to the driving timing control of the timing controller TC.

The data driver circuit DD receives digital image data Data from the timing controller TC and converts the received image data Data into analog data signals to output the converted data signals to the plurality of data lines DL.

The gate driving circuit GD can supply the gate signals to the plurality of gate lines GL in response to the timing control of the timing controller TC. The gate driving circuit GD is supplied with a first gate voltage corresponding to a turn-on level voltage and a second gate voltage corresponding to a turn-off level voltage together with various gate driving control signals GCS to generate gate signals and can supply the generated gate signals to the plurality of gate lines GL.

For example, the data driving circuit DD is connected to the display panel 110 in a tape automated bonding (TAB) manner or connected to a bonding pad of the display panel 110 in a chip on glass (COG) or a chip on panel (COP) manner, or is implemented in a chip on film (COF) manner to be connected to the display panel 110.

The gate driving circuit GD is connected to the display panel 110 in a tape automated bonding (TAB) manner or connected to a bonding pad of the display panel 110 in a chip on glass (COG) or a chip on panel (COP) manner, or is implemented in a chip on film (COF) manner to be connected to the display panel 110. Alternatively, the gate driving circuit GD can be formed in a non-active area NA of the display panel 110 as a gate in panel (GIP) type. The gate driving circuit GD can be disposed on a substrate SUB or connected to the substrate SUB. For example, when the gate driving circuit GD is a gate in panel (GIP) type, the gate driving circuit can be disposed in the non-active area NA of the substrate SUB. When the gate driving circuit GD is a chip-on glass (COG) type or a chip-on film (COF) type, the gate driving circuit can be connected to the substrate.

For example, at least one driving circuit among the data driving circuit DD and the gate driving circuit GD can also be disposed in the active area AA of the display panel 110. For example, at least one driving circuit among the data driving circuit DD and the gate driving circuit GD can also be disposed so as not to overlap the sub pixels PXL or disposed so as to partially or entirely overlap the sub pixels PXL.

The data driving circuit DD can also be connected to one side (for example, an upper side or a lower side) of the display panel 110. Depending on a driving method or a panel design method, the data driving circuit DD can be connected to both sides (for example, the upper side and the lower side) of the display panel 110 or connected to two or more side surfaces of four side surfaces of the display panel 110.

The gate driving circuit GD can also be connected to one side (for example, a left side or a right side) of the display panel 110. Depending on a driving method or a panel design method, the gate driving circuit GD can be connected to both sides (for example, the left side and the right side) of the display panel 110 or connected to two or more side surfaces of four side surfaces of the display panel 110.

The timing controller TC can also be implemented as a component separated from the data driving circuit DD or can be integrated with the data driving circuit DD to be implemented as an integrated circuit.

The timing controller TC can be a timing controller which is used in a general display technique or a control device which includes a timing controller to further perform another control function, or a control device which is different from the timing controller, or a circuit in the control device. The timing controller TC can be implemented by various circuits or electronic components, such as an integrated circuit (IC), a field programmable gate array (FPGA), an application specific integrated circuit (ASIC), or a processor.

The timing controller TC can be electrically connected to the data driving circuit DD and the gate driving circuit GD by means of a printed circuit board (PCB) or a flexible printed circuit board (FPCB).

The timing controller TC can transmit and receive a signal with the data driving circuit DD in accordance with one or more predetermined interfaces. Here, for example, the interface can include a low voltage differential signaling (LVDS) interface, an EPI interface, or a serial peripheral interface (SPI).

The display apparatus 100 according to the exemplary embodiments of the present disclosure can include a touch sensor and a touch sensing circuit to further provide not only an image displaying function but also a touch sensing function. The touch sensing circuit senses the touch sensor to detect whether a touch occurs by a touch object, such as a finger or a pen or to detect a touched position.

The touch sensing circuit can include a touch driving circuit TDC which drives and senses the touch sensor to generate and output touch sensing data and a touch controller TCO which senses the touch generation or detects the touch position using the touch sensing data.

The touch sensor can include a plurality of touch electrodes. The touch sensor can further include a plurality of touch lines which electrically connects the plurality of touch electrodes and the touch driving circuit TDC.

The touch sensor can also be provided at the outside of the display panel 110 as a touch panel or provided in the display panel 110. When the touch sensor is provided at the outside of the display panel 110, the touch sensor is referred to as an external type. When the touch sensor is an external type, the touch panel and the display panel 110 are separately manufactured to be combined during an assembling process. The external type of touch panel can include a substrate for a touch panel and a plurality of touch electrodes on the substrate for a touch panel.

When the touch sensor is provided in the display panel 110, a touch sensor can be formed on the substrate SUB together with signal lines and electrodes related to the display driving, during the process of manufacturing the display panel 110.

The touch driving circuit TDC supplies a touch driving signal to at least one of the plurality of touch electrodes and senses at least one of the plurality of touch electrodes to generate touch sensing data.

The touch sensing circuit can perform touch sensing in the self-capacitance sensing manner or a mutual-capacitance sensing manner.

When the touch sensing circuit performs the touch sensing in the self-capacitance sensing manner, the touch sensing circuit can perform the touch sensing based on capacitance between each touch electrode and a touch object (for example, a finger or a pen).

According to the self-capacitance sensing manner, each of the plurality of touch electrodes serves also as a driving touch electrode and can also serve as a sensing touch electrode. The touch driving circuit TDC can drive all or some of the plurality of touch electrodes and sense all or some of the plurality of touch electrodes.

When the touch sensing circuit performs the touch sensing in the mutual-capacitance sensing manner, the touch sensing circuit can perform the touch sensing based on the capacitance between touch electrodes.

According to the mutual-capacitance sensing method, the plurality of touch electrodes is divided into driving touch electrodes and sensing touch electrodes. The touch driving circuit TDC drives the driving touch electrodes and can sense the sensing touch electrodes.

The touch driving circuit TDC and the touch controller TCO included in the touch sensing circuit can be implemented as separate devices or implemented as one device. Further, the touch driving circuit TDC and the data driving circuit DD can also be implemented as separate devices or implemented as one device.

The display apparatus 100 can further include a power supply circuit which supplies various powers to the driving circuit.

The display apparatus 100 according to the exemplary embodiments of the present disclosure can be mobile terminals such as smart phones or tablets or can be monitors or TV with various sizes, but is not limited thereto and can be a display apparatus of various types or sizes which can display information or images.

Figure 2:
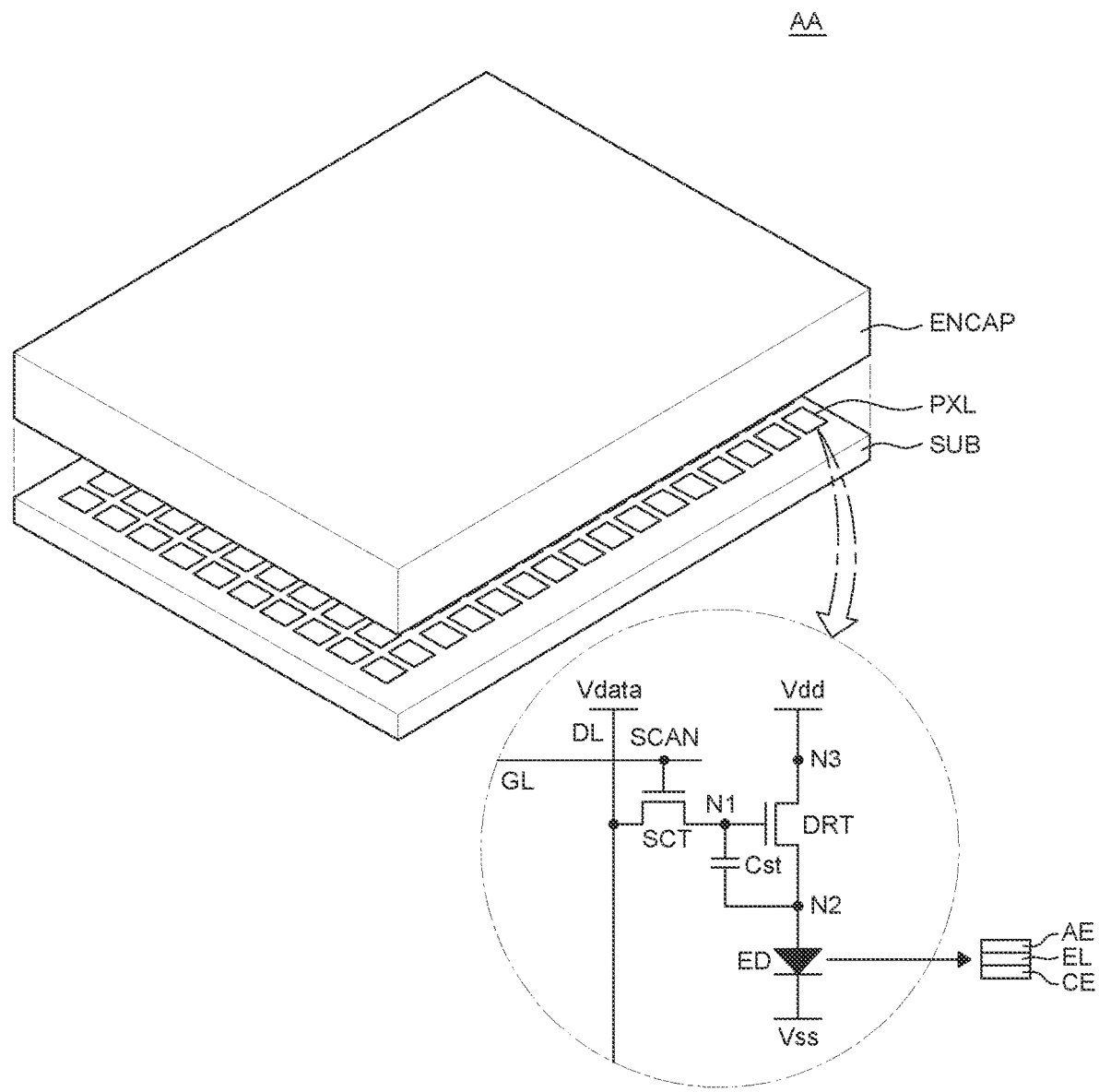
FIG. 2 is a view for explaining a pixel circuit of a display apparatus according to an exemplary embodiment of the present disclosure.

FIG. 2 is a view for explaining a pixel circuit of a display apparatus according to an exemplary embodiment of the present disclosure. Particularly, FIG. 2 illustrates an example of a pixel circuit of a sub pixel PXL of FIG. 1. The active area AA of FIG. 2 can be applied to the active area AA of FIG. 1.

Referring to FIG. 2, each sub pixel PXL disposed on a substrate SUB in an active area AA of a display panel 110 can include a light emitting diode ED, a driving transistor DRT for driving the light emitting diode ED, a scan transistor SCT for transmitting a data voltage Vdata to a first node N1 of the driving transistor DRT, and a storage capacitor Cst for maintaining a constant voltage for one frame.

The driving transistor DRT can include a first node N1 to which the data voltage Vdata is applied, a second node N2 which is electrically connected to the light emitting diode ED, and a third node N3 to which a high potential common voltage Vdd is applied from a driving voltage line DVL. In the driving transistor DRT, the first node N1 is a gate node, the second node N2 can be a source node or a drain node, and the third node N3 can be a drain node or a source node.

The light emitting diode ED can include an anode electrode AE, an emission layer EL, and a cathode electrode CE. The anode electrode AE can be a pixel electrode disposed in each sub pixel PXL. The anode electrode AE can be electrically connected to the second node N2 of the driving transistor DRT of each sub pixel PXL. The cathode electrode CE can be a common electrode which is commonly disposed in a plurality of sub pixels PXL and can be applied with a low potential common voltage Vss.

For example, the anode electrode AE can be a pixel electrode and the cathode electrode CE can be a common electrode. In contrast, the anode electrode AE can be a common electrode and the cathode electrode CE can be a pixel electrode. Hereinafter, for the convenience of description, it is assumed that the anode electrode AE is a pixel electrode and the cathode electrode CE is a common electrode.

For example, the light emitting diode ED can be an organic light emitting diode, an inorganic light emitting diode, or a quantum dot light emitting diode. When the light emitting diode ED is an organic light emitting diode, in the light emitting diode ED, the emission layer EL can include an organic emission layer including an organic material.

The scan transistor SCT is controlled to be turned on/off by a scan signal SCAN which is a gate signal applied through the gate line GL. The scan transistor SCT can be configured to switch the electrical connection between the first node N1 of the driving transistor DRT and the data line DL.

The storage capacitor Cst can be electrically connected between the first node N1 and the second node N2 of the driving transistor DRT.

As illustrated in FIG. 2, each sub pixel PXL can have a 2T (transistor) 1C (capacitor) structure including two transistors DRT and SCT and one capacitor Cst. According to an exemplary embodiment, at least one sub pixel can further include one or more transistors or one or more capacitors.

The storage capacitor Cst can be an external capacitor which is intentionally designed at the outside of the driving transistor DRT, rather than a parasitic capacitor which is an internal capacitor which can be formed between the first node N1 and the second node N2 of the driving transistor DRT.

Each of the driving transistor DRT and the scan transistor SCT can be an n-type transistor or a p-type transistor.

Circuit elements (e.g., a light emitting diode (ED)) in each sub pixel PXL are vulnerable to external moisture or oxygen. Therefore, an encapsulation layer ENCAP for suppressing the permeation of external moisture or oxygen into the circuit elements (e.g., the light emitting diode (ED)) can be disposed on the display panel (for example, the display panel 110 of FIG. 1). The encapsulation layer ENCAP can be disposed so as to cover the light emitting diodes (ED). For example, the encapsulation layer ENCAP can be disposed so as to fully cover the light emitting diodes (ED).

Figure 3:
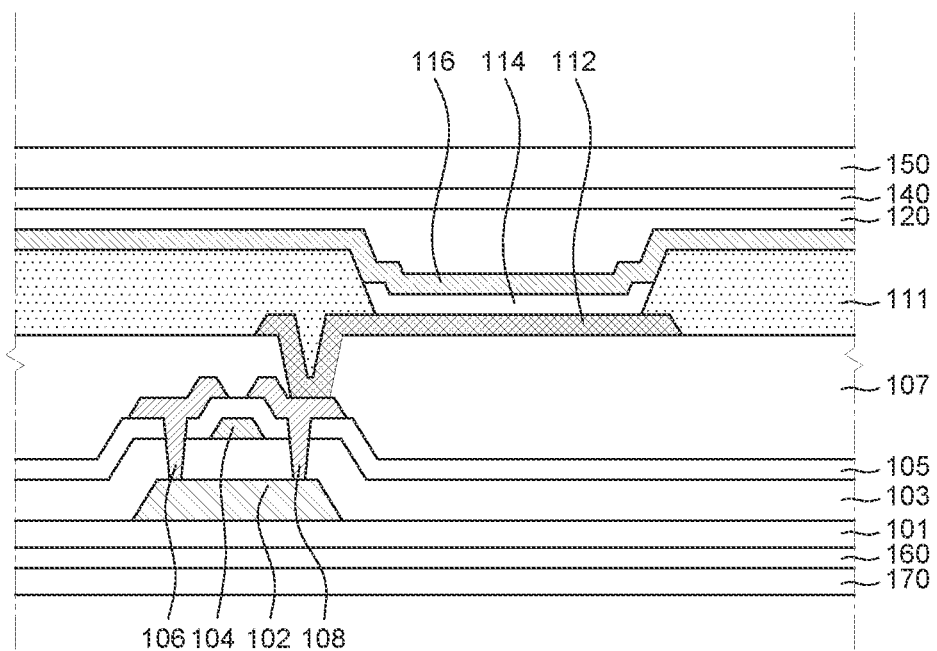
FIG. 3 is a view illustrating an example of a cross-section of at least a part of a display apparatus according to an exemplary embodiment of the present disclosure.

FIG. 3 is a view illustrating an example of a cross-section of at least a part of a display apparatus according to an exemplary embodiment of the present disclosure.

Referring to FIG. 3, thin film transistors (indicated by 102, 104, 106, and 108 together) and organic light emitting diodes (indicated by 112, 114, and 116 together) are located on the substrate 101.

In the exemplary embodiment, the substrate 101 can be a glass or plastic substrate. The substrate 101 can have a flexibility. For example, the substrate 101 includes polyimide or polycarbonate based material to be flexibly bent.

The thin film transistor can include a semiconductor layer 102, a gate insulating film 103, a gate electrode 104, an interlayer insulating film 105, and source and drain electrodes 106 and 108. In the exemplary embodiment, the thin film transistor can be formed by sequentially disposing a semiconductor layer 102, a gate insulating film 103, a gate electrode 104, an interlayer insulating film 105, source and drain electrodes 106 and 108 on the substrate 101. However, the exemplary embodiment of the present disclosure is not limited to this placement.

In the exemplary embodiment, the semiconductor layer 102 can be made of poly silicon (p-Si). In this case, a predetermined region can also be doped with impurities. In one exemplary embodiment, the semiconductor layer 102 can also be made of amorphous silicon (a-Si) or various organic semiconductor materials such as pentacene. In another exemplary embodiment, the semiconductor layer 102 can include oxide.

When the semiconductor layer 102 is formed of polysilicon, amorphous silicon is formed and crystallized to be changed to polysilicon. As a polysilicon crystalizing method, for example, various methods such as lapid thermal annealing (LTA), metal induced lateral crystallization (MILC), or sequential lateral solidification (SLS) can be applied and the exemplary embodiments of the present disclosure are not limited thereto.

The gate insulating film 103 can include an insulating material. For example, the gate insulating film 103 can include insulating materials such as silicon oxide (SiOx) film or silicon nitride (SiNx) film. As another example, the insulating film 103 can also include an insulating organic material.

The gate electrode 104 can include a conductive material. For example, the gate electrode 104 can be formed of magnesium (Mg), aluminum (Al), nickel (Ni), chrome (Cr), molybdenum (Mo), tungsten (W), and gold (Au), or an alloy thereof, but the exemplary embodiments of the present disclosure are not limited thereto.

The interlayer insulating film 105 can include an insulating material. For example, the interlayer insulating film 105 can be formed of an insulating material, such as a silicon oxide (SiOx) film or a silicon nitride (SiNx) film, or can also be formed of an insulating organic material. The interlayer insulating film 105 and the gate insulating film 103 are selectively removed to form a contact hole through which the source and drain regions are exposed.

In the exemplary embodiment, the source and drain electrodes 106 and 108 can be formed on the interlayer insulating film 105 as a single layer or a plurality of layers with a material for an electrode so as to bury the contact hole.

In the exemplary embodiment, a passivation film 107 can be located on the thin film transistor. The passivation film 107 can protect and planarize the thin film transistor. The passivation film 107 can be configured to have various forms. For example, the passivation film 107 can also be formed of an organic insulating film such as benzocyclobutene (BCB) or acryl or an inorganic insulating film such as a silicon nitride (SiNx) film or a silicon oxide (SiOx) film or can be formed of a single layer or double layers or a plurality of layers. However, the exemplary embodiments of the present disclosure are not limited thereto.

The organic light emitting diode can be formed by sequentially disposing a first electrode 112, an organic emission layer 114, and a second electrode 116. For example, the organic light emitting diode can be configured by the first electrode 112 formed on the passivation film 107, the organic emission layer 114 located on the first electrode 112, and the second electrode 116 located on the organic emission layer 114.

The first electrode 112 can be electrically connected to the drain electrode 108 of the driving thin film transistor through the contact hole. The first electrode 112 can be formed of an opaque conductive material having a high reflectance. For example, the first electrode 112 can be formed by silver (Ag), aluminum (Al), aluminum nitride (AlN), gold (Au), molybdenum (Mo), tungsten (W), and chrome (Cr), or an alloy of at least a part thereof, but the exemplary embodiments of the present disclosure are not limited thereto.

A bank 111 can be formed in a remaining area excluding an emission area. Therefore, the bank 111 can have a bank hole which exposes the first electrode 112 corresponding to the emission area. The bank 111 can be formed of an inorganic insulating material, such as a silicon nitride (SiNx) film or a silicon oxide (SiOx) film or an organic insulating material, such as BCB, acrylic resin or imide resin, but the exemplary embodiments of the present disclosure are not limited thereto.

The organic light emitting layer 114 is located on the first electrode 112 which is exposed by the bank 111. In the exemplary embodiment, the organic light emitting layer 114 can include an emission layer, an electron injection layer, an electron transport layer, a hole transport layer and/or a hole injection layer, but the exemplary embodiments of the present disclosure are not limited thereto.

The second electrode 116 is located on the organic light emitting layer 114. In the exemplary embodiment, the second electrode 116 is formed of a transparent conductive material such as indium tin oxide (ITO) or indium zinc oxide (IZO) to emit light generated in the organic emission layer 114 above the second electrode 116.

An upper encapsulation layer 120 is located on the second electrode 116. In the exemplary embodiment, the upper encapsulation layer 120 can be configured by an inorganic film formed of glass, metal, aluminum oxide (AlOx), or silicon (Si) based material, or have a structure in which organic films and inorganic films are alternately laminated, but the exemplary embodiments of the present disclosure are not limited thereto. The upper encapsulation layer 120 suppresses the permeation of the oxygen and moisture from the outside to suppress the oxidation of an emission material and an electrode material. When the organic light emitting diode is exposed to the moisture or oxygen, pixel shrinkage phenomenon in which the light emitting area is reduced is caused or a dark spot can be generated in the light emitting area.

A barrier film 150 is located on the upper encapsulation layer 120 to encapsulate the entire substrate 101 including the organic light emitting diode. The barrier film 150 can be a retardation film or an optically isotropic film. When the barrier film has an optical isotropy, light incident onto the barrier film is transmitted as it is without delaying a phase. An organic film or an inorganic film can be further located on an upper surface or lower surface of the barrier film. The inorganic film can include a silicon oxide (SiOx) film or a silicon nitride (SINx) film. The organic film can include a polymer material such as acrylic resin, epoxy resin, polyimide, or polyethylene, but the exemplary embodiments of the present disclosure are not limited thereto. The organic film or the inorganic film which is formed on an upper surface or a lower surface of the barrier film can block permeation of the moisture or oxygen.

An adhesive layer 140 can be located between the barrier film 150 and the upper encapsulation layer 120. The adhesive layer 140 bonds the upper encapsulation layer 120 and the barrier film 150 to each other. The adhesive layer 140 can be a thermal curable or natural curable adhesive, but the exemplary embodiments of the present disclosure are not limited thereto. For example, the adhesive layer 140 can be configured by a material such as a barrier pressure sensitive adhesive (B-PSA), but the exemplary embodiments of the present disclosure are not limited thereto.

A lower adhesive layer 160 and a lower encapsulation layer 170 can be sequentially formed below the substrate 101. The lower encapsulation layer 170 can be formed of one or more organic materials of polyethylene naphthalate (PEN), polyethylene terephthalate (PET), polyethylene ether phthalate, polycarbonate, polyarylate, polyether imide, polyether sulfonate, polyimide, or polyacrylate. However, the exemplary embodiments of the present disclosure are not limited thereto. The lower encapsulation layer 170 can suppress the permeation of the moisture or oxygen into the substrate from the outside.

The lower adhesive layer 160 is formed by a thermal curable or natural curable adhesive, and can bond the substrate 101 and the lower encapsulation layer 170. For example, the lower adhesive layer 160 can be formed of a material such as optically cleared adhesive (OCA).

Figure 4:
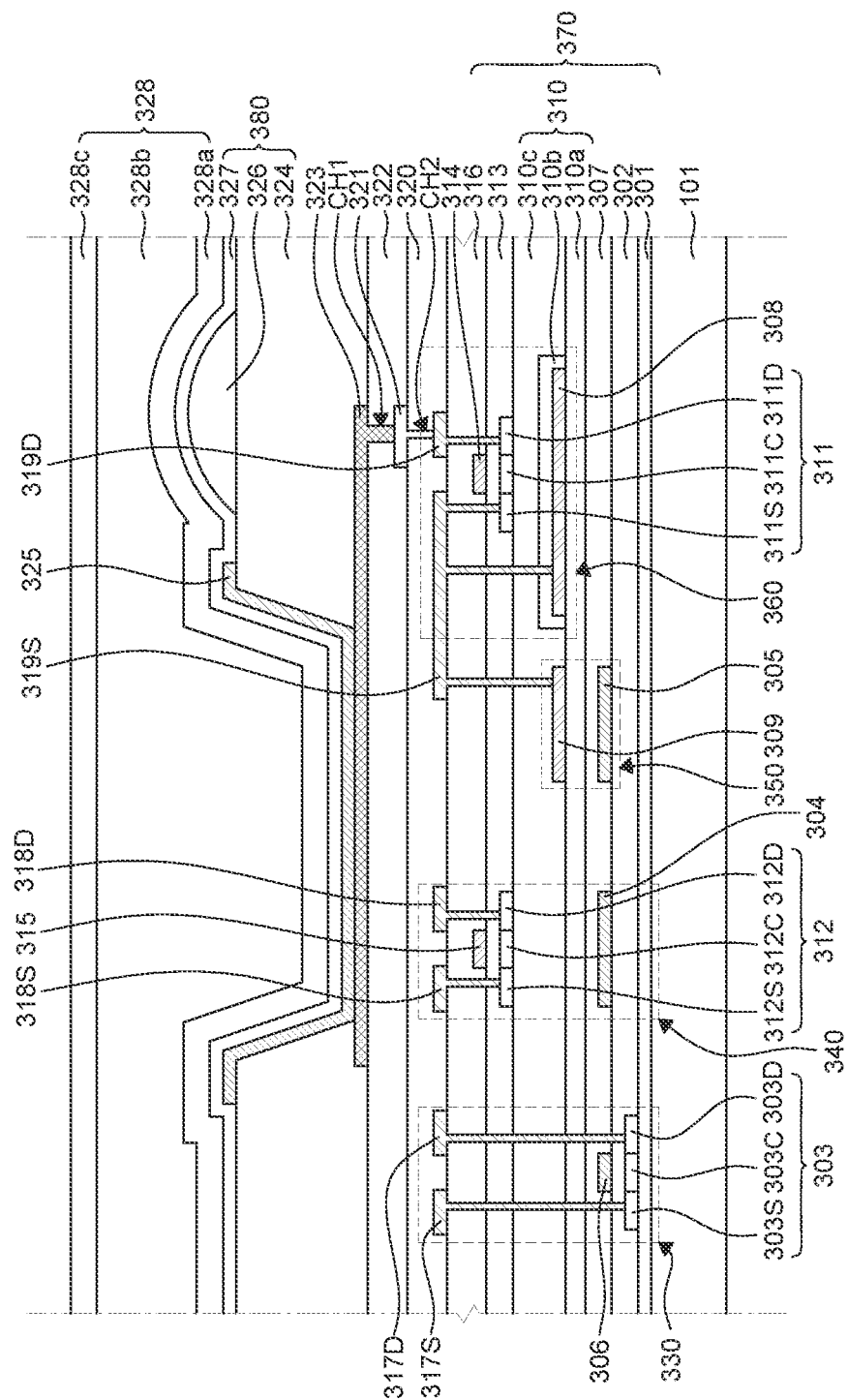
FIG. 4 is a view illustrating another example of a cross-section of at least a part of a display apparatus according to an exemplary embodiment of the present disclosure.

FIG. 4 is a view illustrating another example of a cross-section of at least a part of a display apparatus according to an exemplary embodiment of the present disclosure. Particularly, FIG. 4 is a cross-sectional view of one driving transistor 360, two switching transistors 330 and 340, and one storage capacitor 350 according to one exemplary embodiment. At least one of one driving transistor 360 and two switching transistors 330 and 340 of FIG. 4 can be implemented to include oxide semiconductor.

Referring to FIG. 4, with respect to one sub pixel PXL, as illustrated in FIG. 2, the sub pixel PXL includes a driving element unit 370 and a light emitting diode unit 380 which is electrically connected to the driving element unit 370 on the substrate 101. The driving element unit 370 and the light emitting diode unit 380 are insulated by the planarization layers 320 and 322.

The driving element unit 370 can refer to an array unit including the driving transistor 360, the switching transistors 330 and 340, and the storage capacitor 350 to drive one sub pixel. The light emitting diode unit 380 can refer to an array unit including the anode electrode, the cathode electrode and an emission layer disposed therebetween to emit light.

In FIG. 4, as an example of the driving element unit 370, one driving transistor 360, two switching transistors 330 and 340, and one storage capacitor 350 are illustrated, but it is not limited thereto.

According to the exemplary embodiment, the driving transistor 360 and at least one switching transistor uses the oxide semiconductor layer as an active layer. The oxide semiconductor layer is a layer configured by an oxide semiconductor material and has an excellent leakage current blocking effect and has a manufacturing cost cheaper than the transistor using the polycrystalline semiconductor layer. For example, the oxide semiconductor layer can be IGZO, ZnO, $SnO_2$, $Cu_2O$, NiO, ITZO, or IAZO, but the exemplary embodiments of the present disclosure are not limited thereto. According to the exemplary embodiment of the present disclosure, in order to reduce power consumption and lower a manufacturing cost, the driving transistor 360 and at least one switching transistor can be implemented using the oxide semiconductor layer.

A transistor using a polycrystalline semiconductor layer, including a polycrystalline semiconductor material, for example, polycrystalline silicon (poly-Si) has a fast operation speed and an excellent reliability. Based on the advantage of the polycrystalline semiconductor layer, FIG. 4 illustrates an example that one of the switching transistors is manufactured using the polycrystalline semiconductor layer. The remaining transistor can be configured as a transistor including an oxide semiconductor layer. However, it is not limited to the exemplary embodiment illustrated in FIG. 4.

In the exemplary embodiment, the substrate 101 can be configured as a multi-layer in which at least one organic layer and at least one inorganic layer are alternately laminated. For example, the substrate 101 can be formed by alternately laminating organic films such as polyimide and inorganic films such as silicon oxide ($SiO_2$), but the exemplary embodiments of the present disclosure are not limited thereto.

Referring to FIG. 4, a lower buffer layer 301 can be disposed on the substrate 101. The lower buffer layer 301 can block a material permeable from the outside, for example, moisture. The lower buffer layer 301 can use a plurality of laminated oxide silicon ($SiO_2$) films. According to an exemplary embodiment, a second buffer layer can be further formed on the lower buffer layer 301 to protect from the moisture permeation.

A first switching thin film transistor 330 is formed on the substrate 101. The first switching thin film transistor 330 can use the polycrystalline semiconductor layer as an active layer. The first switching transistor 330 can include a first active layer 303 including a channel through which electrons or holes move. The first switching film transistor 330 can include a first gate electrode 306, a first source electrode 317S, and a first drain electrode 317D.

The first active layer 303 can be configured by a polycrystalline semiconductor material. The first active layer 303 includes a first channel region 303C in the middle and can include a first source region 303S and a first drain region 303D with the first channel region 303C therebetween.

The first source region 303S and the first drain region 303D can include a region in which an intrinsic polycrystalline semiconductor pattern is doped with group 5 or group 3 impurity ions, for example, phosphorus (P) or boron (B) at a predetermined concentration to be conductive.

The first channel region 303C can provide a path through which electrons and holes move by maintaining the intrinsic state of the polycrystalline semiconductor material.

In the exemplary embodiment, the first switching transistor 330 can include a first gate electrode 306 which overlaps the first channel region 303C of the first active layer 303. The first gate insulating layer 302 can be disposed between the first gate electrode 306 and the first active layer 303.

In the exemplary embodiment, the first switching transistor 330 can be implemented by a top gate type in which the first gate electrode 306 is located above the first active layer 303. In this case, the first capacitor electrode 305 configured by a first gate electrode material and a second light shielding layer 304 of a second switching thin film transistor 340 can be formed by one mask process. Therefore, mask processes can be reduced.

In the exemplary embodiment, the first gate electrode 306 can be configured by a metal material. For example, the first gate electrode 306 can be formed of a single layer or a plurality of layers formed of any one of molybdenum (Mo), aluminum (Al), chrome (Cr), gold (Au), titanium (Ti), nickel (Ni), neodymium (Nd), and copper (Cu), or an alloy thereof, but is not limited thereto.

In the exemplary embodiment, the first interlayer insulating layer 307 can be deposited on the first gate electrode 306. The interlayer insulating layer 307 can be configured by silicon nitride (SiNx). The first interlayer insulating layer 307 configured by silicon nitride (SiNx) can include hydrogen particles. The hydrogen particles which are included in the first interlayer insulating layer 307 permeate the first source region 303S and the first drain region 303D while performing a thermal processing process after forming the first active layer 303 and depositing the first interlayer insulating layer 307 on the first active layer 303. Therefore, the hydrogen particles can contribute to improving and stabilizing a conductivity of a polycrystalline semiconductor material. This can be referred to as a hydrogenation process.

In the exemplary embodiment, the first switching transistor 330 can sequentially further include an upper buffer layer 310, a second gate insulating layer 313, and a second interlayer insulating layer 316 on the first interlayer insulating layer 307. The first switching transistor 330 includes a first source region 303S and a first drain region 303D connected to the first source electrode 317S and the first drain electrode 317D respectively which are formed on the second interlayer insulating layer 316.

In the exemplary embodiment, the upper buffer layer 310 can make a space between the first active layer 303 configured by the polycrystalline semiconductor material and the second active layer 312 of the second switching transistor 340 and the third active layer 311 of the driving transistor 360 which are configured by oxide semiconductor layers. The upper buffer layer 310 can provide a base for forming the second active layer 312 and the third active layer 311.

In the exemplary embodiment, the second interlayer insulating layer 316 can include an interlayer insulating layer which covers the second gate electrode 315 of the second switching transistor 340 and the third gate electrode 314 of the driving transistor 360. The second interlayer insulating layer 316 can be formed on the second active layer 312 and the third active layer 311 configured by the oxide semiconductor material to be formed as an inorganic film which does not include hydrogen particles.

In the exemplary embodiment, the first source electrode 317S and the first drain electrode 317D can be formed of a single layer or a plurality of layers formed of any one of molybdenum (Mo), aluminum (Al), chrome (Cr), gold (Au), titanium (Ti), nickel (Ni), neodymium (Nd), and copper (Cu), or an alloy thereof, but is not limited thereto.

In the exemplary embodiment, the second switching transistor 340 can include a second active layer 320 which is formed on the upper buffer layer 310 and is configured by the second oxide semiconductor layer, a second gate insulating layer 313 which covers the second active layer 312, a second gate electrode 315 formed on the second gate insulating layer 313, a second interlayer insulating layer 316 which covers the second gate electrode 315, and a second source electrode 318S and a second drain electrode 318D which are formed on the second interlayer insulating layer 316.

According to the exemplary embodiment, the second switching transistor 340 is located above the upper buffer layer 310 and can further include a second light shielding layer 304 overlapping the second active layer 312. Here, the second light shielding layer 304 is configured by the same material as the first gate electrode 306 and can be formed on an upper surface of the first gate insulating layer 302.

According to the exemplary embodiment, the second light shielding layer 304 is electrically connected (see dotted line) to the second gate electrode 315 to configure a dual gate. When the second switching transistor 340 has a dual gate structure, the flow of current flowing through the second channel layer 312C can be more precisely controlled and the display apparatus can be manufactured to be smaller so that a display apparatus having a high resolution can be implemented.

In the exemplary embodiment, the second active layer 312 can include an intrinsic second channel region 312C which is configured by an oxide semiconductor material and is not doped with impurities and a second source region 312S and a second drain region 312D which are doped with impurities to be conductive.

In the exemplary embodiment, the second source electrode 318S and the second drain electrode 318D can be formed of a single layer or a plurality of layers formed of any one of molybdenum (Mo), aluminum (Al), chrome (Cr), gold (Au), titanium (Ti), nickel (Ni), neodymium (Nd), and copper (Cu), or an alloy thereof, like the first source electrode 317S and the first drain electrode 317D. However, the exemplary embodiments of the present disclosure are not limited thereto.

In the exemplary embodiment, the second source electrode 318S and the second drain electrode 318D and the first source electrode 317S and the first drain electrode 317D can be simultaneously formed on the second interlayer insulating layer 316 with the same material. In this case, the number of mask processes can be reduced.

In the exemplary embodiment, the driving transistor 360 can be formed on the upper buffer layer 310. The driving transistor 360 can include the third active layer 311 configured by the first oxide semiconductor layer. Here, the first oxide semiconductor pattern and the third active layer are substantially the same so that the same reference numeral will be used to be described.

As the driving transistor, a polycrystalline semiconductor pattern which is advantageous for high speed operation is used as an active layer. However, the driving thin film transistor including a polycrystalline semiconductor pattern has a big problem in that a leakage current is caused in an off-state, and thus, a large power is consumed. Accordingly, the exemplary embodiment of the present disclosure proposes a driving transistor in which an oxide semiconductor which is advantageous to block the leakage current is used as an active layer.

However, in the case of the transistor which uses the oxide semiconductor pattern as an active layer, due to a characteristic of the material of the oxide semiconductor, a current fluctuation value is large with respect to a unit voltage fluctuation value so that a failure can occur in a low grayscale region in which precise current control is necessary. Accordingly, in the exemplary embodiment of the present disclosure, a driving transistor in which a current fluctuation value is relatively insensitive in the active layer, with respect to the fluctuation value of a voltage applied to the gate electrode, can be provided.

Referring to FIG. 4, the driving transistor 360 can include a third active layer 311 configured on the upper buffer layer 310 by the first oxide semiconductor layer, a second gate insulating layer 313 which covers the third active layer 311, a third gate electrode 314 formed on the second gate insulating layer 313 and overlaps the second active layer 311, a second interlayer insulating layer 316 which covers the third gate electrode 314, and a third source electrode 319S and a third drain electrode 319D which are disposed on the second interlayer insulating layer 316.

According to the exemplary embodiment, the driving transistor 360 can further include a first light shielding layer 308 which is disposed in the upper buffer layer 310 and overlaps the third active layer 311. The first light shielding layer 308 can be implemented to be inserted into the upper buffer layer 310.

A shape that the first light shielding layer 308 is disposed in the upper buffer layer 310 will be described by reflecting a process characteristic. The first light shielding layer 308 can be formed on an upper first sub buffer layer 310a disposed on the first interlayer insulating layer 307. An upper second sub buffer layer 310b fully covers the first light shielding layer 308 from the upper portion and an upper third sub buffer layer 310c is formed on the upper second sub buffer layer 310b. For example, the upper buffer layer 310 has a structure in which the upper first sub buffer layer 310a, the upper second sub buffer layer 310b, and the upper third sub buffer layer 310c are sequentially laminated.

In the exemplary embodiment, the upper first sub buffer layer 310a and the upper third sub buffer layer 310c can be configured by silicon oxide ($SiO_2$). The upper first sub buffer layer 310a and the upper third sub buffer layer 310c are configured by silicon oxide ($SiO_2$) which does not include hydrogen particles so as to contribute as a base of the second switching thin film transistor 340 and the driving thin film transistor 360. The second switching thin film transistor 340 and the driving thin film transistor 360 use the oxide semiconductor layer as an active layer whose reliability can be degraded by hydrogen particles.

The upper second sub buffer layer 310b can be configured by silicon nitride (SiNx) having an excellent ability to collect hydrogen particles. The upper second sub buffer layer 310b can be formed to enclose all a top surface and side surfaces of the first light shielding layer 308 to completely seal the first light shielding layer 308.

Hydrogen particles generated during the hydrogenation process of the first switching transistor 330 using the polycrystalline semiconductor layer as an active layer pass through the upper buffer layer 310, and thus, the reliability of the oxide semiconductor layer located on the upper buffer layer 310 can be damaged. For example, when the hydrogen particles permeate the oxide semiconductor layer, there can be problems in that the transistor including the oxide semiconductor layer can have different threshold voltages from each other depending on a location where the oxide semiconductor layer is formed or a conductivity of the channel can vary.

However, silicon nitride (SiNx) included in the upper buffer layer 310 has an excellent ability to collect hydrogen particles as compared with silicon oxide ($SiO_2$) so that the damage of the reliability of the driving thin film transistor 360 generated when the hydrogen particles permeate the oxide semiconductor layer can be suppressed.

In the exemplary embodiment, the first light shielding layer 308 can be configured by a metal layer including a titanium (Ti) material having excellent ability to collect hydrogen particles. For example, the first light shielding layer 308 can include a titanium single layer or a double layer of molybdenum (Mo) and titanium (Ti), or an alloy of molybdenum (Mo) and titanium (Ti). However, it is not limited thereto, and another metal layer including titanium (Ti) is also possible.

Here, titanium (Ti) captures hydrogen particles diffusing into the upper buffer layer 310 and can suppress the hydrogen particles from reaching the first oxide semiconductor pattern 311. In this case, the first light shielding layer 308 of the driving transistor 360 is configured by a metal layer, such as titanium having an ability to collect hydrogen particles. Further, the first light shielding layer 308 is enclosed by a silicon nitride (SiNx) layer having an ability to collect hydrogen particles so that the reliability of the oxide semiconductor pattern by the hydrogen particles can be ensured.

In the exemplary embodiment, the upper second sub buffer layer 310b including silicon nitride (SiNx) is not deposited on the entire surface of the active area, like the upper first sub buffer layer 310a, but can be deposited on at least a part of the top surface of the upper first sub buffer layer 310a to selectively cover only the first light shielding layer 308. The upper second sub buffer layer 310b is formed of a material different from that of the upper first sub buffer layer 310a, for example, the silicon nitride (SiNx) film. Therefore, when the upper second sub buffer layer 310b is deposited on the entire surface of the active area, film lifting can occur. In order to compensate for this, the upper second sub buffer layer 310b can be selectively formed only in a location where the first light shielding layer 308 is formed, which is required for the function.

In the exemplary embodiment, the first light shielding layer 308 and the upper second sub buffer layer 310b can be formed vertically below the first oxide semiconductor layer 311 to overlap the first oxide semiconductor layer 311 by its function. The first light shielding layer 308 and the upper second sub buffer layer 310b can be formed to be larger than the first oxide semiconductor layer 311 to fully overlap the first oxide semiconductor layer 311.

In the exemplary embodiment, the third source electrode 319S of the driving transistor 360 can be electrically connected to the first light shielding layer 308.

In the exemplary embodiment, the storage capacitor 350 stores a data voltage which is applied through the data line for a predetermined period and then can supply the stored data voltage to the light emitting diode. The storage capacitor 350 can include two corresponding electrodes and a dielectric material disposed therebetween. The storage capacitor 350 can include a first storage electrode 305 disposed on the same layer as the first gate electrode 306 with the same material and a second storage electrode 309 disposed on the same layer as the first light shielding layer 308 with the same material. The first interlayer insulating layer 307 and the upper first sub buffer layer 310a can be located between the first storage electrode 305 and the second storage electrode 309. The first storage electrode 309 of the storage capacitor 350 can be electrically connected to the third source electrode 319S.

In FIG. 4, an example that the storage capacitor 350 is formed at one side to be separated from the driving transistor 360 is illustrated. However, it is not limited thereto and depending on the exemplary embodiment, the storage capacitor 350 can be formed to be laminated on the driving transistor 360. In this case, at least a part of the third source electrode 319S connected to the second storage electrode 309 can be omitted. For example, a fourth gate electrode can be further formed on the third gate electrode 314 of the driving transistor 360. At this time, the third gate electrode 314 and the fourth gate electrode can be spaced apart from each other with a predetermined interval and a capacitor can be formed based thereon.

In the exemplary embodiment, a first planarization layer 320 and a second planarization layer 322 which planarize an upper end of the driving element unit 370 can be disposed on the driving element unit 370. The first planarization layer 320 and the second planarization layer 322 can be configured by an organic film, such as polyimide or acryl resin.

The light emitting diode unit 380 is formed on the second planarization layer 322. The light emitting diode unit 380 includes a first electrode 323 as an anode electrode, a second electrode 327 which is a cathode electrode corresponding to the first electrode 323, and an emission layer 325 interposed between the first electrode 323 and the second electrode 327. The first electrode 323 can be formed in every sub pixel.

In the exemplary embodiment, the light emitting diode unit 380 can be connected to a driving element unit 370 through a connection electrode 321 formed on the first planarization layer 320. For example, the first electrode 323 of the light emitting diode unit 380 and the third drain electrode 319D of the driving transistor 360 which configures the driving element unit 370 can be connected by the connection electrode 321.

In the exemplary embodiment, the first electrode 323 can be connected to the connection electrode 321 exposed through a contact hole CH1 which passes through the second planarization layer 322. Further, the connection electrode 321 can be connected to the third drain electrode 319D exposed through the contact hole CH2 which passes through the first planarization layer 320.

The first electrode 323 can be formed to have a multi-layered structure including a transparent conductive film and an opaque conductive film having a high reflection efficiency. The transparent conductive film is formed of a material having a relatively high work function, such as indium-tin-oxide (ITO) or indium-zinc-oxide (IZO), and the opaque conductive film can be formed with a single or multi-layered structure including Al, Ag, Cu, Pb, Mo, and Ti, or an alloy thereof. However, the exemplary embodiments of the present disclosure are not limited thereto. For example, the first electrode 323 can be formed with a structure in which a transparent conductive film, an opaque conductive film, and a transparent conductive film are sequentially laminated or a structure in which a transparent conductive film and an opaque conductive film are sequentially laminated. However, the exemplary embodiments of the present disclosure are not limited thereto.

In the exemplary embodiment, the emission layer 325 can be formed by laminating a hole related layer, an organic emission layer, and an electron related layer on the first electrode 323 in this order or in a reverse order.

In the exemplary embodiment, the organic light emitting diode can include a first electrode 323, a hole injection layer, and a first hole transport layer disposed on a substrate in which red, green and blue sub pixel areas are defined. Red, green, and blue sub pixel areas are divided on the first hole transport layer and in each area, hole related layer, an organic emission layer, and an electron related layer for emitting each color light can be formed. According to the exemplary embodiment, at least one of the pixel areas can have a plurality of stack structures. For example, in the red sub pixel area, a first red emission unit (or light emitting unit or a red light emitting unit) including a first red emission layer can be included. In the green sub pixel area, a first green emission unit (or light emitting unit or a green light emitting unit) including a first green emission layer and a second green emission unit (or light emitting unit or a green light emitting unit) including a second green emission layer can be included. In the blue sub pixel area, a first blue emission unit (or light emitting unit or a blue light emitting unit) including a first blue emission layer and a second blue emission unit (or light emitting unit or a blue light emitting unit) including a second blue emission layer can be included. Such a structure can be referred to as an RGB tandem structure, but is not limited by the term.

In the exemplary embodiment, the bank layer 324 can expose the first electrode 323 of each sub pixel and can be referred to as a pixel definition film. According to the exemplary embodiment, the bank layer 324 can be formed of an opaque material, for example, black, to suppress the light interference between adjacent sub pixels. In this case, the bank layer 324 can include a light shielding material which is formed of at least any one of a color pigment, organic black, and carbon, but the exemplary embodiments of the present disclosure are not limited thereto. A spacer 326 can be disposed on the bank layer 324.

In the exemplary embodiment, the second electrode 327 which is a cathode electrode is disposed on a top surface and side surfaces of the emission layer 325 so as to be opposite to the first electrode 323 with the emission layer 325 therebetween. The second electrode 327 can be integrally formed on the entire surface of the active area. When the second electrode 327 is applied to a top-emission type organic light emitting display apparatus, the second electrode can be configured by a transparent conductive film, such as indium-tin-oxide (ITO) or indium-zinc-oxide (IZO), but the exemplary embodiments of the present disclosure are not limited thereto.

In the exemplary embodiment, an encapsulation unit 328 which suppresses the moisture permeation can be further disposed on the second electrode 327. The encapsulation unit 328 can include a first inorganic encapsulation layer 328a, a second organic encapsulation layer 328b, and a third inorganic encapsulation layer 328c which are sequentially laminated.

The first inorganic encapsulation layer 328a and the third inorganic encapsulation layer 328c of the encapsulation unit 328 can be formed of an inorganic material, such as silicon oxide (SiOx). The second organic encapsulation layer 328b of the encapsulation unit 328 can be formed of an organic material such as acryl resin, epoxy resin, phenolic resin, polyamide resin, or polyimide resin, but the exemplary embodiments of the present disclosure are not limited thereto.

Figure 5:
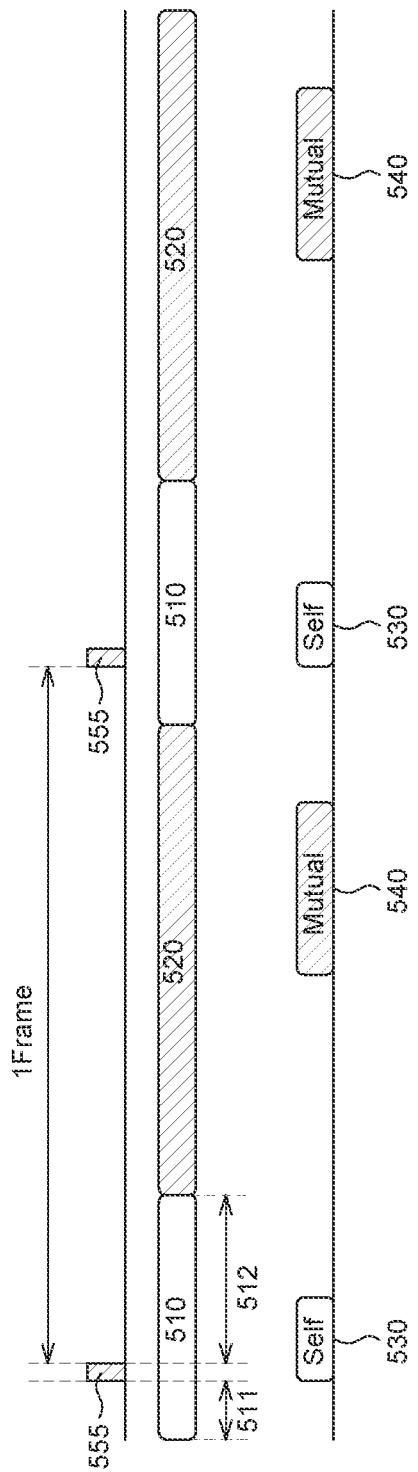
FIG. 5 is a view for explaining an example of touch sensing of a display apparatus according to an exemplary embodiment of the present disclosure.

FIG. 5 is a view for explaining an example of touch sensing of a display apparatus according to an exemplary embodiment of the present disclosure.

Referring to FIG. 5, the display apparatus according to the exemplary embodiment of the present disclosure can include a plurality of periods related to the display driving. For example, the display apparatus can include a stand-by period 510 and a driving period 520 with regard to the display driving. The stand-by period 510 can include a period in which the display is not performed on the display panel. The driving period 520 can include a period in which the display is performed on the display panel.

In the exemplary embodiment, the stand-by period 510 can be referred to as a porch period. The stand-by period 510 can include a front porch 511 and a back porch 512 periods. The front porch 511 can refer to a period before the timing when a synchronization signal 555 is input, when the synchronization signal Vsync 555 is input during the stand-by period 510. The back porch 512 can refer to a period after a timing when the input of the synchronization signal 555 ends. For example, when the synchronization signal 555 is input for a predetermined time, the front porch 511 can correspond to a period from a timing when the stand-by period 510 starts to a timing when the synchronization signal 555 is input. The back porch 512 can correspond to a period from a timing when the input of the synchronization signal 555 ends to a timing when the stand-by period 510 ends.

In the exemplary embodiment, the synchronization signal 555 can be a signal which displays the start or the end of one screen. When the synchronization signal 555 is input for a predetermined time, a width of the synchronization signal 555 can correspond to a predetermined time. A time when the synchronization signal 555 is input can be referred to as a vertical sync time, but is not limited by the term.

In the exemplary embodiment, a unit of performing the display driving can be referred to as a frame. The frame can correspond to an interval when the synchronization signal 555 is input. For example, as illustrated in the drawing, one frame 1Frame can include a period before inputting a subsequent synchronization signal 555 after inputting the synchronization signal 555.

According to the exemplary embodiment, the display apparatus can include a first driving circuit and a second driving circuit. The first driving circuit is a circuit related to the display of the display apparatus and for example, can include at least one of a data driving circuit (for example, the data driving circuit 120 of FIG. 1), a gate driving circuit (for example, the gate driving circuit GD of FIG. 1), and a timing controller (for example, the timing controller 140 of FIG. 1). The second driving circuit can include a touch sensing circuit, for example, a touch sensing circuit of FIG. 1. In order to be stably driven, the display apparatus can use a synchronization signal 555 which is a reference signal for synchronizing the first driving circuit and the second driving circuit for the sake of stable operation. For example, a synchronization signal 555 having a constant period is generated and/or used to match the operations of the first driving circuit and the second driving circuit.

In the exemplary embodiment, the first driving circuit can hold a driving signal during the stand-by period 510. The first driving circuit can supply the driving signal to the display panel during the driving period 520. The second driving circuit can supply a self-sensing signal for self-sensing 530 to the display panel during the stand-by period 510. The second driving circuit can supply a mutual sensing signal for mutual sensing 540 to the display panel during the driving period 520.

In the exemplary embodiment, the driving period 520 can include a period in which effective data related to the driving of the panel is input. For example, the driving period 520 can include a time period in which data is input to the data line included in the panel to drive the panel.

In the exemplary embodiment, the touch sensing of the display apparatus can be performed in various ways. For example, the touch sensing of the display apparatus can be performed using the self-sensing 530 and the mutual sensing 540.

In the exemplary embodiment, according to the self-sensing 530 manner, when the touch input is applied, the display apparatus sequentially transmits the driving signal to electrodes corresponding to the X-axis and the Y-axis and sequentially senses the driving signal. By doing this, the display apparatus can identify an electrode (or information about the electrode, for example, position information) to which the touch input is applied.

In the exemplary embodiment, a basic capacitance can be defined in each electrodes corresponding to the X-axis and an electrode corresponding to the Y-axis in advance and in this case, when the touch input is applied to a specific electrode, the capacitance change can be caused. The display apparatus sequentially checks each electrodes corresponding to the X-axis and the electrode corresponding to the Y-axis to sense the change in the capacitance to identify an electrode in which the change in the capacitance is generated and can identify the position of the touch input based thereon. Such a touch input identifying method can be referred to as a self-sensing 530 manner. In some cases, the self-sensing 530 manner can be also referred to as self-capacitance sensing, but it is not limited by the term.

In the exemplary embodiment, according to the mutual sensing 540, the display apparatus can identify the touch position using the change in the capacitance generated between the transmission touch electrode Tx and the reception touch electrode Rx.

In one exemplary embodiment, according to the mutual sensing 540, the electric field generated in the transmission touch electrode is absorbed by the finger to change the mutual capacitance between the transmission touch electrode and the reception touch electrode. In this case, a signal of the transmission touch electrode can be transmitted to the reception touch electrode by the coupling between the transmission touch electrode and the reception touch electrode. Therefore, when the signal is applied to the transmission touch electrode, the display apparatus senses the change in the capacitance by the reception touch electrode to identify the position of the touch input. Such a touch input identifying method can be referred to as a mutual sensing manner. In some cases, the mutual sensing manner can be also referred to as mutual capacitance sensing, but it is not limited by the term.

In the exemplary embodiment, the display apparatus can use both the self-sensing 530 and the mutual sensing 540 manners. For example, the self-sensing 530 and the mutual sensing 540 can be performed in one frame related to the driving of the display apparatus.

Referring to FIG. 5, in the exemplary embodiment, the display apparatus can perform the self-sensing 530 in the stand-by period 510 and perform the mutual sensing 540 in the driving period 520. In one exemplary embodiment, the display apparatus can perform the self-sensing 530 during the back porch 512 period. The display apparatus can perform the mutual sensing 540 during at least a part of the driving period 520.

In the exemplary embodiment, a period in which the self-sensing 530 is performed can be shorter than the back porch 512 period. The self-sensing 530 starts within a predetermined time range from the start time of the back porch 512 period and can end before ending the back porch 512 period. The mutual sensing 540 can be shorter than the driving period 520. The mutual sensing 540 can be performed in at least a part of the driving period 520.

In the exemplary embodiment, a length of the self-sensing 530 period can be shorter than the length of the mutual sensing 540 period. The mutual sensing 540 can be performed longer than the self-sensing 530.

In the exemplary embodiment, the self-sensing 530 and the mutual sensing 540 can be repeated in every frame. For example, during the stand-by period 510 of a first frame, the self-sensing 530 is performed and during the driving period 520, the mutual sensing 540 can be performed. Next, when a second frame starts, during the stand-by period 510 of the second frame, the self-sensing 530 is performed again and during the driving period 520, the mutual sensing 540 can be performed again.

According to the exemplary embodiment of the present disclosure, the self-sensing 530 is performed during the stand-by period 510 so that the interference of the self-sensing 530 and the driving for display of the display apparatus can be minimized. In this case, a noise which can be caused by the self-sensing 530 is not applied to a wiring line for driving the display apparatus so that the display quality can be improved. Further, the fluctuation of the data voltage due to the noise which can be caused by the self-sensing 530 is minimized or removed to improve the defect and improve the display quality.

Figure 6A:
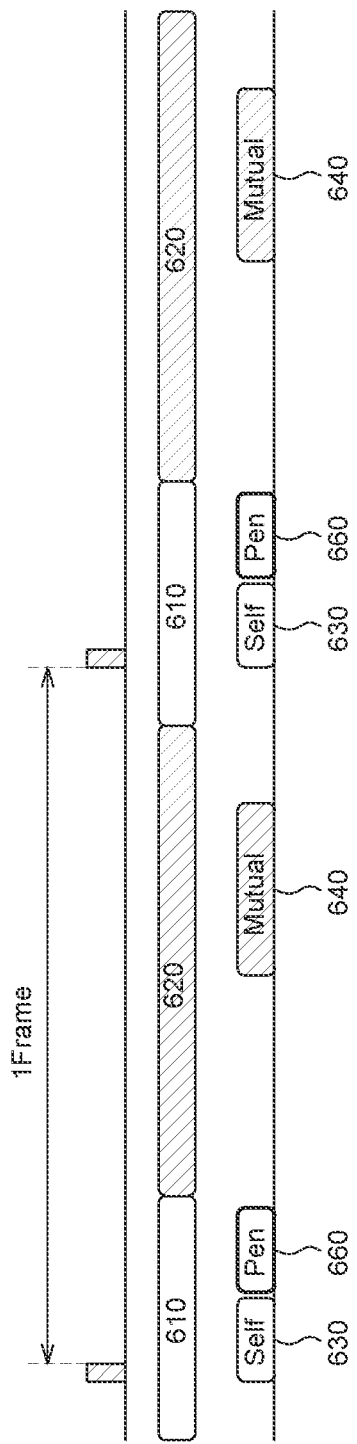
FIGS. 6A and 6B are views for explaining another example of touch sensing of a display apparatus according to an exemplary embodiment of the present disclosure.
Figure 6B:
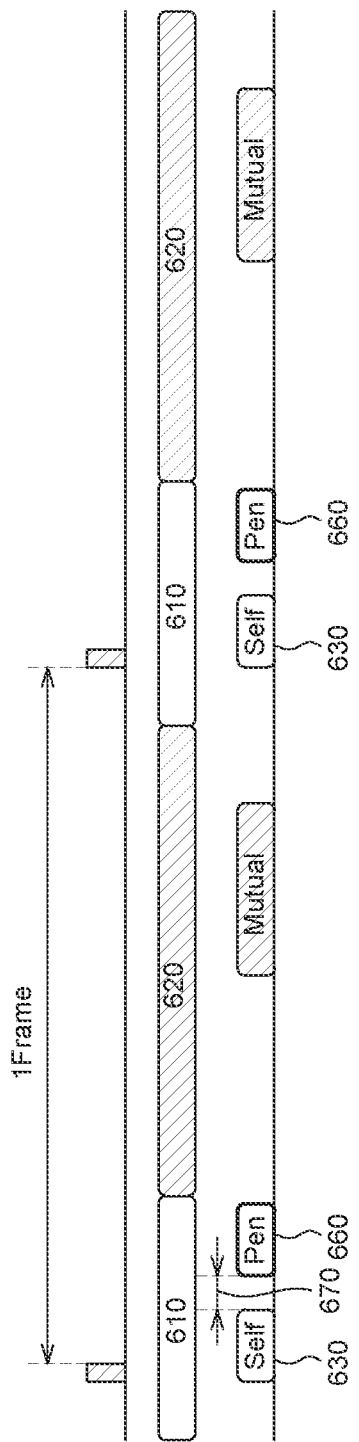

FIGS. 6A and 6B are views for explaining another example of touch sensing of a display apparatus according to an exemplary embodiment of the present disclosure. Particularly, FIGS. 6A and 6B are views for explaining an example in which pen sensing 660 is further performed in the display apparatus.

Referring to FIGS. 6A and 6B, the pen sensing 660 can be further performed in the stand-by period 610. In the exemplary embodiment, the pen-sensing 660 can include a sensing method of sensing a pen connected to the display apparatus. Here, the pen can be a stylus, a smart pen, an electronic pen, a digital pen, a touch screen pen, or any other object that can provide input to the display apparatus via contact or contactless or other means. Similarly, "pen sensing" includes sensing of any such pen or input from any such pen.

In the exemplary embodiment, during the pen sensing 660 period, the display apparatus sequentially transmits the driving signal to the electrodes corresponding to the X-axis and the Y-axis and sequentially senses the driving signal to identify an electrode to which the pen input is applied. The display apparatus can identify the position of the pen input on the display panel based on the identified position of the electrode. The display apparatus can receive information related to the state of the pen (or state information) from the pen in response to the pen input. For example, the display apparatus can receive information about at least one of a remaining battery amount of the pen, operation information of the pen, a type of the pen input, and a pressure of the pen input, in response to the pen input.

Referring to FIG. 6A, the pen sensing 660 can be performed after the self-sensing 630. For example, when the self-sensing 630 ends, the display apparatus can perform the pen-sensing 660.

In the exemplary embodiment, the pen sensing 660 can be performed in the back-porch period. However, it is not limited thereto and the pen sensing 660 can be performed in at least a part of the stand-by period 610.

In the exemplary embodiment, the length of the pen-sensing 660 period can be specified in advance. The length of the pen sensing 660 period can be shorter than the mutual sensing 640. The length of the pen sensing 660 period can be shorter than the stand-by period 610.

In the exemplary embodiment, the pen sensing signal for the pen sensing 660 can be provided from the second driving circuit, for example, provided from the touch sensing circuit to the display panel.

In the exemplary embodiment, the period in which the self-sensing signal is provided, for example, the self-sensing 630 period is referred to as a first period and the period in which the pen sensing signal is provided, for example, the pen sensing 660 period can be referred to as a second period. The first period is separated from the second period and an interval between the first period and the second period can be specified in advance.

For example, referring to FIG. 6B, after the self-sensing 630 ends and the holding period 670 has passed, the pen sensing 660 can be performed. The holding period 670 can correspond to the interval between the first period and the second period. The holding period 670 can include a period in which the touch sensing function, for example, the self-sensing 630 and the pen sensing 660 are not performed. The holding period 670 can be specified in advance.

The display apparatus according to the exemplary embodiment of the present disclosure performs the self-sensing 630 and the pen sensing 660 during the stand-by period 610 to minimize the interference with the driving for display of the display apparatus. In this case, a noise which can be caused by the self-sensing 630 and/or the pen sensing 660 is not applied to a wiring line for driving the display apparatus so that the display quality can be improved. In the display apparatus, the fluctuation of the data voltage caused by the noise which can be caused by the self-sensing 630 and/or the pen sensing 660 is minimized or removed to improve defect and to improve the display quality.

Figure 7:
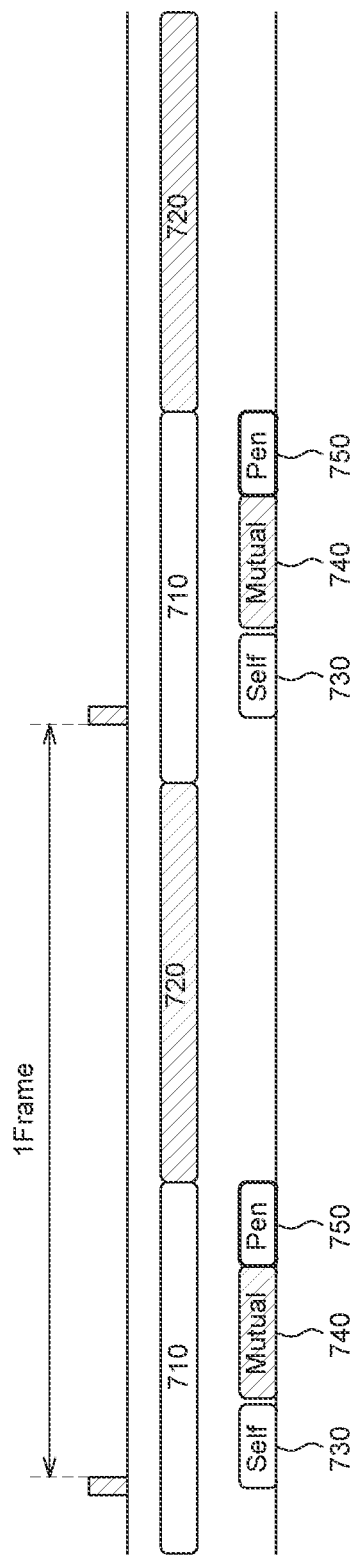
FIG. 7 is a view for explaining still another example of touch sensing of a display apparatus according to an exemplary embodiment of the present disclosure.

FIG. 7 is a view for explaining still another example of touch sensing of a display apparatus according to an exemplary embodiment of the present disclosure.

Referring to FIG. 7, during the stand-by period 710, the self-sensing 730, the mutual sensing 740, and the pen sensing 750 can be performed in the stand-by period 710. In the exemplary embodiment, the self-sensing 730, the mutual sensing 740, and the pen sensing can be sequentially performed. However, it is not limited thereto and, in some cases, the order of the self-sensing 730, mutual sensing 740, and the pen sensing 750 can be changed. For example, after performing the self-sensing 730, the pen sensing 750 is performed, and then the mutual sensing 740 can be performed.

In the exemplary embodiment, among the self-sensing 730, the mutual sensing 740, and the pen sensing 750, a length of the period of the mutual sensing 740 can be the longest.

In the exemplary embodiment, the self-sensing 730, the mutual sensing 740, and the pen sensing 750 can be performed in the back porch period of the stand-by period 710.

Figure 8:
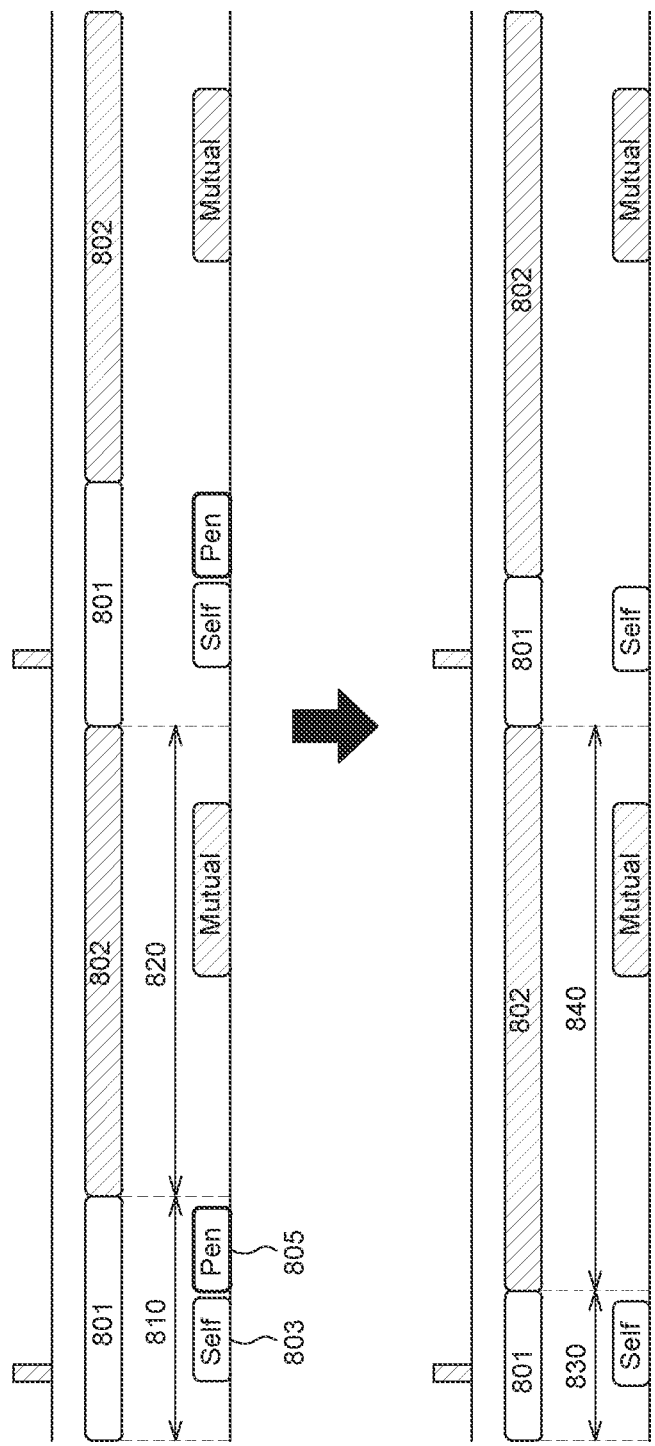
FIG. 8 is a view illustrating an example of controlling a length of a touch sensing period in a display apparatus according to an exemplary embodiment of the present disclosure.

FIG. 8 is a view illustrating an example of controlling a length of a touch sensing period in a display apparatus according to an exemplary embodiment of the present disclosure.

Referring to FIG. 8, the self-sensing 803 and the pen sensing 805 can be performed in the stand-by period 801. In this case, the length of the stand-by period 801 can have a first length 810. The length of the driving period 802 can have a second length 820. The first length 810 and the second length 820 can be predetermined lengths. The first length 810 can be shorter than the second length 820.

In the exemplary embodiment, the pen sensing 805 can be omitted. In this case, the length of the stand-by period 801 can be changed from the first length 810 to the third length 830. The third length 830 can be shorter than the first length 810. Corresponding to an omission of the pen sensing 805, the third length 830 can be a length specified in advance.

In the exemplary embodiment, the third length 830 can correspond to a length obtained by subtracting the length corresponding to the pen sensing 805 period from the first length 810. In another exemplary embodiment, the third length 830 can correspond to a length obtained by subtracting more than the length of the pen sensing 805 from the first length 810.

In the exemplary embodiment, as the first length 810 is changed to the third length 830, the second length 820 can be changed to a fourth length 840. The fourth length 840 can correspond to a length longer than the second length 820. Corresponding to an omission of the pen sensing 805, the fourth length 840 can be a length specified in advance.

In the exemplary embodiment, the display apparatus can sense whether the pen sensing 805 is omitted. For example, when the display apparatus receives an input to start the pen sensing 805, it can be identified that the pen sensing 805 is being performed. In this case, the display apparatus can control the length of the stand-by period 801 to be equal to the first length 810. In some cases, the display apparatus controls the length of the stand-by period 801 to be the first length 810 and can control the length of the driving period 802 to be the second length 820.

As another example, when the display apparatus receives an input to end the pen sensing 805, it can be identified that the pen sensing 805 is being omitted. In this case, the display apparatus can control the length of the stand-by period 801 to be equal to the third length 830. In some cases, the display apparatus controls the length of the stand-by period 801 to be the third length 830 and can control the length of the driving period 802 to be the fourth length 840.

In the exemplary embodiment, the length of the stand-by period 801 can vary in accordance with the period in which the pen sensing signal is provided. For example, when the first input which triggers (or causes) the pen sensing signal to be supplied is received, the length of the stand-by period can correspond to the first length 810. When the second input which stops providing the pen sensing signal is received, the length of the stand-by period can correspond to the third length 830 which is shorter than the first length 810.

Figure 9:
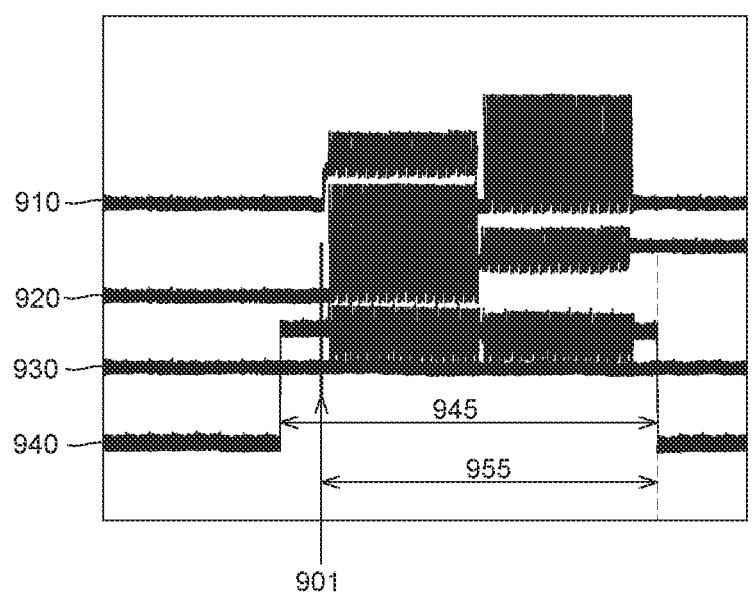
FIG. 9 is a view for explaining a touch sensing period of a display apparatus according to an exemplary embodiment of the present disclosure.

FIG. 9 is a view for explaining a touch sensing period of a display apparatus according to an exemplary embodiment of the present disclosure. Particularly, FIG. 9 is a view for explaining an example in which the self-sensing is performed in the stand-by period 945.

Referring to FIG. 9, with regard to the self-sensing, a self-sensing transmission signal 910 and a self-sensing reception signal 920 can be identified. With regard to the stand-by period 945, a TE signal 940 can be identified. The TE signal is a tearing effect signal and a period in which the signal value is high can correspond to the stand-by period 945. A period in which the signal value of the TE signal is low can correspond to the driving period.

In the exemplary embodiment, when the self-sensing is performed in the stand-by period 945, a signal as illustrated in FIG. 9 can be identified. For example, in the stand-by period 945, a self-sensing transmission signal 910 and a self-sensing reception signal 920 can be identified.

In the exemplary embodiment, a synchronization signal 930 can be input in the stand-by period 945. The synchronization signal 930 can be input at a first timing 901. A period before the synchronization signal 930 is input in the stand-by period 945 can correspond to a front porch period. A period after the synchronization signal 930 is input in the stand-by period 945 can correspond to a back porch period 955.

In the exemplary embodiment, the self-sensing can be performed in the back porch period 955. For example, in the back porch period 955 after the first time 901, the display apparatus can perform the self-sensing based on the self-sensing transmission signal 910 and the self-sensing reception signal 920.

Figure 10:
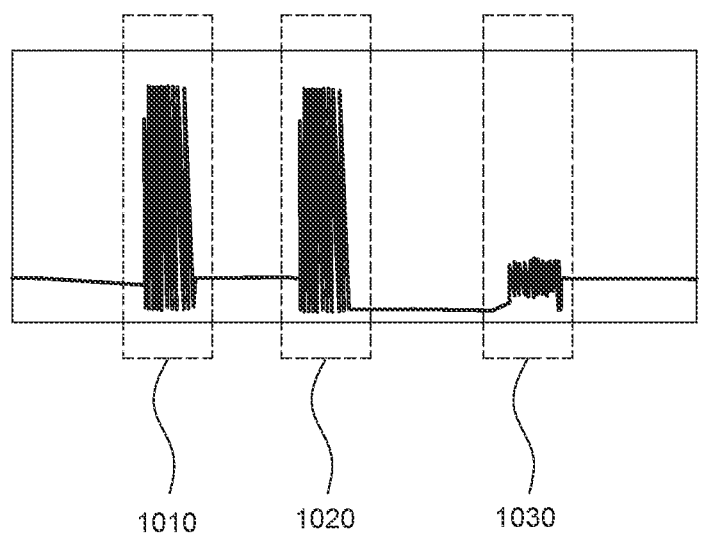
FIG. 10 is a view for explaining a touch signal of a display apparatus according to an exemplary embodiment of the present disclosure.

FIG. 10 is a view for explaining a touch signal of a display apparatus according to an exemplary embodiment of the present disclosure.

Referring to FIG. 10, the display apparatus can identify various touch signals. For example, the display apparatus can identify a pen sensing signal 1010, a mutual sensing signal 1020, and a self-sensing signal 1030. At least a part of the pen sensing signal 1010, the mutual sensing signal 1020, and the self-sensing signal 1030 can have different voltage values from each other. For example, the voltage value of the self-sensing signal 1030 can be lower than the voltage values of the mutual sensing signal 1020 and the pen-sensing signal 1010.

Figure 11A:
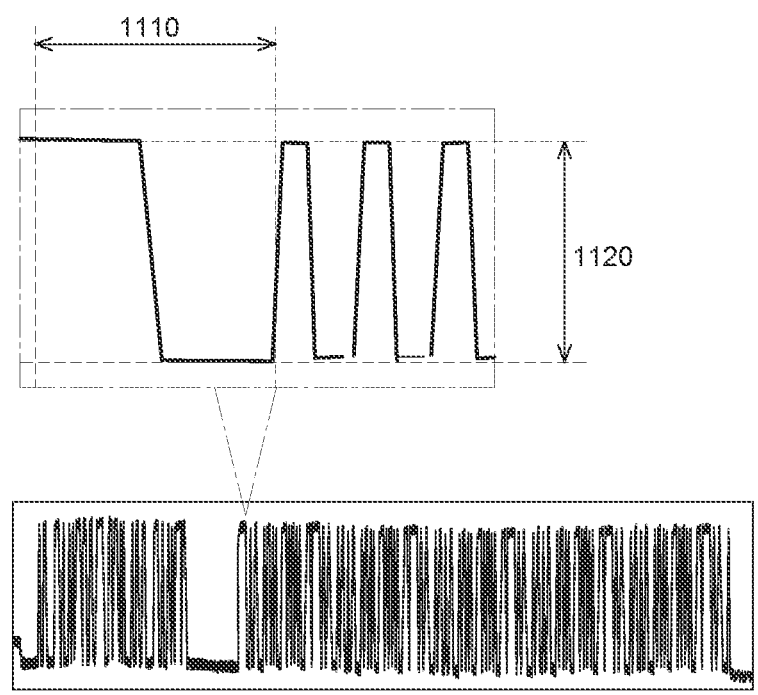
FIGS. 11A, 11B, and 11C are views illustrating an example of a signal waveform for every touch type of a display apparatus according to an exemplary embodiment of the present disclosure.
Figure 11B:
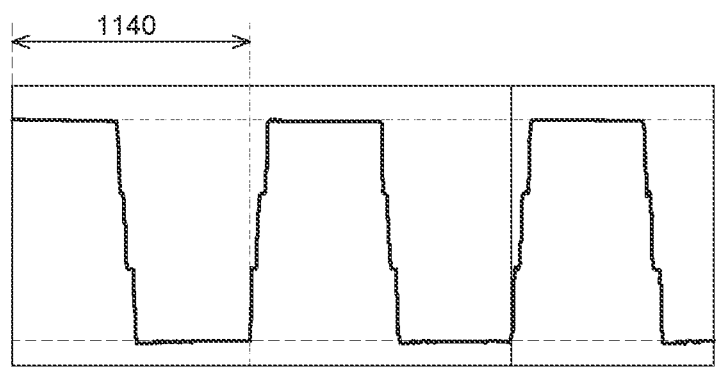
Figure 11C:
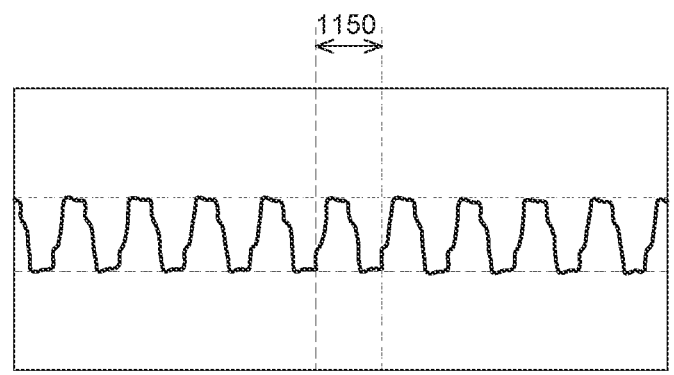

More specific examples of each of the pen sensing signal 1010, the mutual sensing signal 1020, and the self-sensing signal 1030 will be referenced to FIGS. 11A, 11B, and 11C.

FIGS. 11A, 11B, and 11C are views illustrating an example of a signal waveform for every touch type of a display apparatus according to an exemplary embodiment of the present disclosure.

Particularly, FIG. 11A illustrates an example of pen sensing signals 660, 750, and 805 of FIGS. 6A, 6B, 7, and 8. FIG. 11B illustrates a mutual sensing signal, for example, an example of mutual sensing signals 540, 640, and 740 of FIGS. 5, 6A, 6B, 7, and 8. FIG. 11C illustrates an example of pen sensing signals 530, 630, and 730, and 803 of FIGS. 5, 6A, 6B, 7, and 8. Hereinafter, the description will be made with reference to FIGS. 11A, 11B, and 11C together.

In the exemplary embodiment, a voltage value of the self-sensing signal can be lower than voltage values of the mutual sensing signal and the pen sensing signal. For example, a height of a waveform can correspond to the voltage value in FIGS. 11A, 11B, and 11C and it can be understood that the voltage value of the self-sensing signal is lower than the voltage values of the mutual sensing signal and the pen sensing signal.

In the exemplary embodiment, a period, a voltage, and a phase of the self-sensing signal and the mutual sensing signal can be constant. In one exemplary embodiment, referring to FIGS. 11B and 11C, waveforms of the self-sensing signal and the mutual sensing signal can be repeated with a specific shape in a predetermined period. As the self-sensing signal and the mutual sensing signal have a predetermined period, respectively, that waveforms of the self-sensing signal and the mutual sensing signal can be repeated in a predetermined period. For example, referring to FIG. 11B, a waveform of the self-sensing signal can be repeated in a first period 1140. Referring to FIG. 11C, a waveform of the mutual sensing signal can be repeated in a second period 1150.

In the exemplary embodiment, the voltage and the phase of the self-sensing signal and the mutual sensing signal can be constant. As the self-sensing signal and the mutual sensing signal have constant voltage and phase, a specific shape of waveform can be maintained.

In the exemplary embodiment, referring to FIG. 11A, at least one of a period 1110, a voltage 1120, and a phase of the pen sensing signal can vary. For example, as illustrated in the drawing, a predetermined part of the period of the pen sensing signal 1110 can be reduced. A variable pattern of at least one of the period 1110, the voltage 1120, and the phase of the pen sensing signal can be specified in advance so as to correspond to a type of pen related to the panel or a type of software installed in the display apparatus. Here, the variable pattern includes a shape of a waveform of the pen sensing signal. The variable pattern can be irregularly represented.

In the exemplary embodiment, the pen sensing signal can include information related to a state of the pen connected to the display apparatus. For example, the pen sensing signal can include information about at least one of a remaining battery of the pen, a type of pen input (for example, a line shape, a dot shape, a dotted line shape, select input, delete input), an identification of the pen, a state (for example, hovering) of the pen input, a coordinate of a pen input, a pressures of the pen input, whether to input a button disposed on the pen, a maintaining time of the pen input, and a communication state.

In the exemplary embodiment, the mutual sensing signal and the self-sensing signal can include information about a high level and a low level. The high level and the low level of each of the mutual sensing signal and the self-sensing signal can be specified in advance.

A display apparatus according to an aspect of the present disclosure includes a panel which includes a plurality of sub pixels and a plurality of touch electrodes, a first driving circuit which supplies a driving signal to the panel in a driving period and holds the driving signal in the stand-by period and a second driving circuit which supplies a mutual sensing signal to the panel in the driving period and supplies a self-sensing signal to the panel in the stand-by period.

The second driving circuit can further supply a pen sensing signal to the panel in the stand-by period.

In the stand-by period, a first period in which the self-sensing signal is provided and a second period in which the pen sensing signal is provided can include and an interval between the first period and the second period can be specified in advance.

A voltage value of the self-sensing signal can be lower than voltage values of the mutual sensing signal and the pen sensing signal.

Periods, voltages, and phases of the self-sensing signal and the mutual sensing signal can be constant. For instance, each of a period, a voltage, a phase of each of the self-sensing signal and the mutual sensing signal can be constant.

A variable pattern of at least one of the period, the voltage, and the phase of the pen sensing signal can be predetermined corresponding to a type of pen related to the panel or a type of software installed in the display apparatus.

The period of the mutual sensing signal and/or the period of the self-sensing signal can be constant.

A length of the stand-by period varies in accordance with a period in which the pen sensing signal can be provided.

When a first input which triggers to provide the pen sensing signal is received, the length of the stand-by period can correspond to a first length, and when a second input which stops providing the pen sensing signal is received, the length of the stand-by period can correspond to a second length which is shorter than the first length.

The pen sensing signal can include information related to a state of the pen connected to the display apparatus.

The first driving circuit can further provide a synchronization signal to the second driving circuit, the stand-by period includes a front porch period before a timing of providing the synchronization signal and a back porch period after the timing of providing the synchronization signal, and the self-sensing signal is identified in the back porch period.

Each of the plurality of sub pixels can include at least one oxide transistor.

Each of the plurality of sub pixels can include a light emitting diode, the light emitting diode can include at least one light emitting unit including an anode electrode, a cathode electrode, and a plurality of organic layers, and a charge generation layer disposed between the light emitting units, and each of the plurality of organic layers can include a hole transport layer, an emission layer, and an electronic transport layer.

The panel can further include an encapsulation layer disposed on the plurality of sub pixels and the plurality of touch electrodes is disposed on the encapsulation layer.

The first driving circuit can include at least one of a data driving circuit which supplies a data voltage to the panel, a gate driving circuit which supplies a gate signal to the panel, and a timing controller which supplies a synchronization signal to the second driving circuit, and the second driving circuit can include a touch sensing circuit which controls a touch signal to the panel.

Although the exemplary embodiments of the present disclosure have been described in detail with reference to the accompanying drawings, the present disclosure is not limited thereto and can be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display apparatus, comprising:
    a panel including a plurality of sub pixels and a plurality of touch electrodes;
    a first driving circuit configured to supply a driving signal to the panel in a driving period and hold the driving signal in a stand-by period; and
    a second driving circuit configured to supply a mutual sensing signal to the panel in the driving period and supply a self-sensing signal to the panel in the stand-by period,
    wherein the panel includes:
        a first thin film transistor;
        a second thin film transistor on a higher layer than the first thin film transistor;

a first planarization layer on the second-switching thin film transistor;
a connection electrode on the first planarization layer;
a second planarization layer on the connection electrode;
a first electrode on the second planarization layer;
a bank layer disposed on the second planarization layer and exposing the first electrode;
an emission layer on the first electrode;
a second electrode on the emission layer; and
an encapsulation unit on the second electrode,
wherein the plurality of touch electrodes is disposed on the encapsulation unit,
wherein the first electrode is connected to the second thin film transistor by the connection electrode,
wherein a first active layer of the first thin film transistor and a second active layer of the second thin film transistor are configured of different materials,
wherein the second driving circuit further supplies a pen sensing signal to the panel in the stand-by period, and
wherein a length of the stand-by period varies in accordance with a period in which the pen sensing signal is provided.

2. The display apparatus according to claim 1, wherein in the stand-by period, a first period in which the self-sensing signal is provided and a second period in which the pen sensing signal is provided are included, and an interval between the first period and the second period is specified in advance.

3. The display apparatus according to claim 1, wherein a voltage value of the self-sensing signal is lower than voltage values of the mutual sensing signal and the pen sensing signal.

4. The display apparatus according to claim 1, wherein at least one of a period, a voltage, and a phase of at least one of the self-sensing signal and the mutual sensing signal is constant.

5. The display apparatus according to claim 4, wherein a variable pattern of at least one of the period, the voltage, and the phase of the pen sensing signal is predetermined to correspond to a type of pen related to the panel or a type of software installed in the display apparatus.

6. The display apparatus according to claim 1, wherein each of a period of the mutual sensing signal and a period of the self-sensing signal are constant.

7. The display apparatus according to claim 1, wherein when a first input which triggers to provide the pen sensing signal is received, the length of the stand-by period corresponds to a first length, and
when a second input which stops providing the pen sensing signal is received, the length of the stand-by period corresponds to a second length which is shorter than the first length.

8. The display apparatus according to claim 1, wherein the pen sensing signal includes information related to a state of the pen associated with the display apparatus.

9. The display apparatus according to claim 1, wherein the first driving circuit further supplies a synchronization signal to the second driving circuit,
the stand-by period includes a front porch period before a timing of providing the synchronization signal and a back porch period after the timing of providing the synchronization signal, and
the self-sensing signal is identified in the back porch period.

10. The display apparatus according to claim 1, wherein each of the plurality of sub pixels includes at least one oxide transistor.

11. The display apparatus according to claim 1, wherein each of the plurality of sub pixels includes a light emitting diode,
the light emitting diode includes the first electrode, the second electrode, and the emission layer including a plurality of organic layers, and
each of the plurality of organic layers includes a hole transport layer, an emitting layer, and an electronic transport layer.

12. The display apparatus according to claim 1, wherein the first driving circuit includes at least one of a data driving circuit configured to supply a data voltage to the panel, a gate driving circuit configured to supply a gate signal to the panel, and a timing controller configured to supply a synchronization signal to the second driving circuit, and
the second driving circuit includes a touch sensing circuit configured to control a touch signal to the panel.

13. The display apparatus according to claim 1, wherein the first active layer is configured by polycrystalline semiconductor material and the second active layer is configured by oxide semiconductor material.

14. The display apparatus according to claim 1, wherein the second driving circuit is further configured to:
preform self-sensing, pen sensing and mutual sensing during one frame period, and
wherein the self-sensing is performed in a self-sensing period, the mutual sensing is performed in a mutual sensing period, and the pen sensing is performed in a pen sensing period between the self-sensing period and the mutual sensing period.

15. The display apparatus according to claim 14, wherein the mutual sensing period occurs during a display portion of the one frame period, and
wherein the self-sensing period and the pen sensing period occur during a non-display portion of the one frame.

16. The display apparatus according to claim 1, wherein the panel further includes a light shielding layer which is disposed under the second thin film transistor.

17. The display apparatus according to claim 16, wherein the panel further includes a storage capacitor comprising a first capacitor electrode and a second capacitor electrode,
wherein the second capacitor electrode of the storage capacitor is disposed in the same layer as the light shielding layer.

18. A display apparatus, comprising:
a panel including a plurality of sub pixels and a plurality of touch electrodes;
a first driving circuit configured to supply a driving signal to the panel in a driving period and hold the driving signal in a stand-by period; and
a second driving circuit configured to supply a self-sensing signal, a mutual sensing signal and a pen sensing signal to the panel in the stand-by period,
wherein the panel includes:
a first thin film transistor;
a second thin film transistor on the first thin film transistor;
a first planarization layer on the second thin film transistor;
a connection electrode on the first planarization layer;
a second planarization layer on the connection electrode;

a first electrode on the second planarization layer;
a bank layer disposed on the second planarization layer and exposing the first electrode;
an emission layer on the first electrode;
a second electrode on the emission layer; and
an encapsulation unit on the second electrode,
wherein the plurality of touch electrodes are disposed on the encapsulation layer,
wherein the first electrode is connected to the second thin film transistor by the connection electrode, wherein a first active layer of the first thin film transistor and a second active layer of the second thin film transistor are configured of different materials, and
wherein a length of the stand-by period varies in accordance with a period in which the pen sensing signal is provided.

19. The display apparatus according to claim 18, wherein the second driving circuit is further configured to:
preform self-sensing, pen sensing and mutual sensing during one frame period, and
wherein the self-sensing is performed in a self-sensing period, the mutual sensing is performed in a mutual sensing period, and the pen sensing is performed in a pen sensing period between the self-sensing period and the mutual sensing period.

20. The display apparatus according to claim 19, wherein the mutual sensing period occurs during a display portion of the one frame period, and
wherein the self-sensing period and the pen sensing period occur during a non-display portion of the one frame.

* * * * *